(12) United States Patent
Morioka et al.

(10) Patent No.: US 9,775,180 B2
(45) Date of Patent: Sep. 26, 2017

(54) RADIO COMMUNICATION SYSTEM

(71) Applicant: NTT DOCOMO, INC., Tokyo (JP)

(72) Inventors: Yasufumi Morioka, Tokyo (JP); Hiroto Yasuda, Tokyo (JP); Jinho Kim, Tokyo (JP); Hideaki Takahashi, Tokyo (JP); Junichiro Hagiwara, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 132 days.

(21) Appl. No.: 14/408,818

(22) PCT Filed: May 15, 2013

(86) PCT No.: PCT/JP2013/063537
§ 371 (c)(1),
(2) Date: Dec. 17, 2014

(87) PCT Pub. No.: WO2014/006982
PCT Pub. Date: Jan. 9, 2014

(65) Prior Publication Data
US 2015/0156802 A1 Jun. 4, 2015

(30) Foreign Application Priority Data
Jul. 4, 2012 (JP) .................................. 2012-150810

(51) Int. Cl.
*H04W 36/14* (2009.01)
*H04W 36/30* (2009.01)
(Continued)

(52) U.S. Cl.
CPC ....... *H04W 76/02* (2013.01); *H04W 36/0083* (2013.01); *H04W 40/02* (2013.01);
(Continued)

(58) Field of Classification Search
CPC ..... H04W 36/14; H04W 84/04; H04W 72/00; H04W 76/025; H04W 80/04;
(Continued)

(56) References Cited

U.S. PATENT DOCUMENTS

2009/0067628 A1\* 3/2009 Pudney ............... H04L 63/0853
380/247
2010/0195621 A1\* 8/2010 Kekki ................... H04W 48/17
370/332
(Continued)

FOREIGN PATENT DOCUMENTS

WO 2011/056607 A1 5/2011

OTHER PUBLICATIONS

International Search Report for corresponding International Application No. PCT/JP2013/063537, dated Jun. 11, 2013 (1 page).
(Continued)

*Primary Examiner* — Edan Orgad
*Assistant Examiner* — Vanneilian Lalchinthang
(74) *Attorney, Agent, or Firm* — Osha Liang LLP

(57) ABSTRACT

The radio communication system has a user equipment, a first base station, a second base station, a serving gateway, and a switching station. The first base station has a control-plane path set to the switching station. The second base station has no control-plane path to the switching station. A path setting determiner determines whether to set a user-plane path, based on measurement information reported from the user equipment. A base station determiner determines, based on identification information obtained by the user equipment, whether a base station to which the user-plane path is to be set is the second base station, the base station corresponding to the obtained identification information.

10 Claims, 19 Drawing Sheets

(51) Int. Cl.
*H04W 76/02* (2009.01)
*H04W 36/00* (2009.01)
*H04W 40/02* (2009.01)
*H04W 76/04* (2009.01)
*H04W 24/10* (2009.01)
*H04W 88/08* (2009.01)

(52) U.S. Cl.
CPC .......... *H04W 76/041* (2013.01); *H04W 24/10* (2013.01); *H04W 88/085* (2013.01)

(58) Field of Classification Search
CPC ... H04W 76/02; H04W 40/02; H04W 88/085; H04W 76/041; H04W 24/10; H04W 36/0083
USPC ........................................................ 370/328
See application file for complete search history.

(56) References Cited

U.S. PATENT DOCUMENTS

| | | | | |
|---|---|---|---|---|
| 2011/0103310 | A1* | 5/2011 | Stojanovski | H04L 12/66 370/328 |
| 2011/0268007 | A1* | 11/2011 | Barany | H04B 7/024 370/312 |
| 2011/0306350 | A1* | 12/2011 | Barbieri | H04B 7/024 455/450 |
| 2012/0044836 | A1 | 2/2012 | Sivavakeesar et al. | |
| 2012/0135771 | A1* | 5/2012 | Futaki | H04B 7/024 455/509 |
| 2012/0303835 | A1* | 11/2012 | Kempf | H04W 24/02 709/235 |
| 2014/0016614 | A1* | 1/2014 | Velev | H04W 4/005 370/331 |
| 2014/0219248 | A1* | 8/2014 | Reddiboyana | H04W 36/14 370/331 |
| 2014/0334418 | A1* | 11/2014 | Urie | H04W 40/02 370/329 |
| 2016/0037511 | A1* | 2/2016 | Vincze | H04B 7/024 370/329 |

OTHER PUBLICATIONS

3GPP TS 36.300 V10.6.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10);" Dec. 2011 (194 pages).

Extended European Search Report in counterpart European Patent Application No. 13813298.0 dated Feb. 2, 2016 (10 pages).

Office Action issued in the counterpart Korean Patent Application No. 10-2014-7036387, dated Dec. 16, 2016 (10 pages)

Zhaojun Li, et al.; "User Plane and Control Plane Separation Framework for Home Base Stations"; The Fujitsu Sci. Tech., vol. 46, No. 1, pp. 79-86; Jan. 2010 (8 pages).

Office Action issued in corresponding European Application No. 13813298.0, dated Jan. 12, 2017 (8 pages).

* cited by examiner

| PhNB IDENTIFICATION INFORMATION | SGW IDENTIFICATION INFORMATION |
|---|---|
| A | 100 |
| B | 101 |
| E | 100 |
| G | 105 |
| ⋮ | ⋮ |

RADIO COMMUNICATION SYSTEM

FIELD OF THE INVENTION

The present invention relates to a radio communication system.

BACKGROUND ART

Various types of radio communication systems in accordance with the 3GPP (Third Generation Partnership Project) standard are in use. In a radio communication system that complies with the LTE/SAE (Long Term Evolution/System Architecture Evolution) standard with 3GPP, a logical communication path (user-plane path (U-Plane path)) used for user data communication is established between a packet gateway (PDN Gateway) and user equipments, via a serving gateway (Serving Gateway) and an eNB (evolved Node B), which is a base station. User equipments can perform communication with an external network (the Internet, etc.), using the established U-Plane path.

More specifically, U-Plane paths (EPS bearers) established between the packet gateway and the user equipment include a U-Plane path (S5/S8bearer) established between the packet gateway and the serving gateway, a U-Plane path (an S1-U bearer) established between the serving gateway and the base station (eNB), and a U-Plane path (a data radio bearer) established between the base station (eNB) and the user equipment. The control (establishment, change, release, etc.) of the U-Plane path can be executed with the initiative by an MME (Mobile Management Entity), which is a switching station. For example, the S1-U bearer is established by the switching station controlling the serving gateway and the base station (eNB), which are endpoints of the S1-U bearer (i.e., the switching station transmits or receives control signals to or from the serving gateway and the base stations via a control-plane path (C-Plane path)).

RELATED ART DOCUMENTS

Non-Patent Documents

Non-Patent Document 1 3GPP TS 36.300 V10.6.0 (2011-12), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)

SUMMARY OF THE INVENTION

Problem to be Solved by the Invention

We assume that the above radio communication system includes new types of base stations in addition to eNBs. These assumed new types of base stations are capable of connecting to serving gateways differing from those to which the eNBs connect. Also, a part of these assumed new types of the base stations do not have a C-Plane path to the switching station. Accordingly, it is difficult to realize a system configuration including a new type of base station such as above, with a conventional radio communication system in which the switching station controls the U-Plane path established between the serving gateway and a conventional base station (eNB).

In consideration of the above conditions, the present invention has, as an object, to realize a radio communication system including a new type of base station.

Means to Solve the Problem

A radio communication system of the present invention has a user equipment; plural base stations radio-communicable with the user equipment; plural serving gateways; and a switching station for controlling a user-plane path that is a logical path that is set between a base station and a serving gateway, the logical path being a path for transmitting a user data signal; the plural base stations including: a first base station having a control-plane path that is a logical path that is set to the switching station, the logical path being a path for transmitting a control signal; and a second base station having no control-plane path to the switching station. The user equipment has a reporter configured to report, to a first base station to which the user equipment is radio-connecting, report information containing measurement information related to reception quality of a radio signal received from each base station and identification information of each base station corresponding to each measurement information. The first base station has a storage device configured to store a base station list having stored pieces of identification information of plural second base stations; a path setting determiner configured to determine whether to set, based on the measurement information reported from the user equipment, a user-plane path having, as one endpoint, a base station corresponding to the measurement information; and a base station determiner configured to determine, based on the identification information reported from the user equipment, whether a base station corresponding to the identification information is the second base station, by using the base station list.

In a preferred embodiment of the present invention, the first base station additionally has a path setting requester configured to transmit, to the switching station, a path setting request requiring the setting of the user-plane path via the control-plane path, in a case in which the path setting determiner determines that the user-plane path is to be established and when the base station determiner determines that a base station to be one endpoint of the user-plane path is the second base station, and the switching station includes a gateway selector that selects a serving gateway to be another endpoint of the user-plane path of which the path setting requester requires setting.

In a preferred embodiment of the present invention, the base station list stored by the storage device of the first base station stores, in association with each other, identification information of the second base station and identification information of a serving gateway that is to be another endpoint of a user-plane path having, as one endpoint, the second base station corresponding to the identification information. The first base station additionally has a gateway selector configured to, when the base station determiner determines that a base station to be the one endpoint of the user-plane path is the second base station in a case in which the path setting determiner determines to set the user-plane path, select a serving gateway to be another endpoint of the user-plane path, by using the base station list; and a path setting requester configured to transmit, to the switching station via the control-plane path, a path setting request requiring setting of the user-plane path between the second base station and the serving gateway selected by the gateway selector.

In a preferred embodiment of the present invention, the switching station has a base station list generator configured to generate the base station list; and a base station list transmitter configured to dynamically transmit the generated base station list to the first base station.

Another radio communication system of the present invention has a user equipment; plural base stations radio-communicable with the user equipment; plural serving gateways; and a switching station for controlling a user-plane path that is a logical path that is set between a base station and a serving gateway, the logical path being a path for transmitting a user data signal, the plural base stations including: a first base station having a control-plane path that is a logical path that is set to the switching station, the logical path being a path for transmitting a control signal; and a second base station having no control-plane path to the switching station. The user equipment has a reporter configured to report, to a first base station to which the user equipment is radio-connecting, report information containing measurement information related to reception quality of a radio signal received from each base station and identification information of each base station corresponding to each measurement information, and the first base station has a base station transmitter configured to transmit the report information reported from the user equipment to the switching station via the control-plane path, and the switching station has a storage device configured to store a base station list having stored pieces of identification information of plural second base stations; a path setting determiner configured to determine whether to set, based on the measurement information reported from the user equipment, a user-plane path having, as one endpoint, a base station corresponding to the measurement information; and a base station determiner configured to determine, based on the identification information reported from the user equipment, whether a base station corresponding to the identification information is the second base station, by using the base station list.

In a preferred embodiment of the present invention, the switching station additionally has a gateway selector configured to, when the base station determiner determines that a base station to be the one endpoint of the user-plane path is the second base station in a case in which the path setting determiner determines to set the user-plane path, select a serving gateway to be another endpoint of the user-plane path having the second base station as the one endpoint.

Another radio communication system of the present invention has a user equipment; plural base stations radio-communicable with the user equipment; plural serving gateways; and a switching station for controlling a user-plane path that is a logical path that is set between a base station and a serving gateway, the logical path being a path for transmitting a user data signal, the plural base stations including: a first base station having a control-plane path that is a logical path that is set to the switching station, the logical path being a path for transmitting a control signal; and a second base station having no control-plane path to the switching station. The user equipment has a storage device configured to store a first base station list having stored pieces of identification information of plural second base stations; a measurement information obtainer configured to obtain measurement information about reception quality of a radio signal received from each base station; an identification information obtainer configured to obtain identification information of a base station corresponding to each measurement information; a base station determiner configured to determine, based on the identification information obtained by the identification information obtainer, whether a base station corresponding to the identification information is the second base station, by using the base station list; and a reporter configured to report, to a first base station to which the user equipment is being radio-connecting, report information containing each measurement information, the identification information corresponding to the each measurement information, and determination information indicating whether the base station corresponding to the identification information is the second base station.

In a preferred embodiment of the present invention, the first base station has a path setting determiner configured to determine whether to set, based on the measurement information reported from the user equipment, a user-plane path having, as one endpoint, a base station corresponding to the measurement information; a storage device configured to store a second base station list that associates identification information of a second base station and identification information of a serving gateway that is to be another endpoint of the user-plane path having, as one endpoint, a second base station corresponding to the identification information; a gateway selector configured to, when the determination information reported from the user equipment indicates that a base station to be the one endpoint of the user-plane path is the second base station in a case in which the path setting determiner determines to set the user-plane path, select a serving gateway to be another endpoint of the user-plane path, by using the second base station list; and a path setting requester configured to transmit, to the switching station via the control-plane path, a path setting request requiring setting of the user-plane path between the second base station and the serving gateway selected by the gateway selector.

In a preferred embodiment of the present invention, the first base station has a base station transmitter configured to transmit the report information reported from the user equipment to the switching station via the control-plane path, and the switching station has a path setting determiner configured to determine whether to set, based on the measurement information contained in the report information transmitted from the first base station, a user-plane path having, as one endpoint, a base station corresponding to the measurement information; and a gateway selector configured to, when the dete mination information contained in the report information indicates that a base station to be the one endpoint of the user-plane path is the second base station in a case in which the path setting determiner determines to set the user-plane path, select a serving gateway to be another endpoint of the user-plane path.

In a preferred embodiment of the present invention, the switching station has a base station list generator configured to generate the first base station list; and a base station list transmitter configured to dynamically transmit the generated first base station list to the user equipment via the first base station.

In a preferred embodiment of the present invention, the switching station additionally has a path controller configured to transmit a first path setting instruction instructing to set the user-plane path between the serving gateway and the second base station, to the serving gateway to be another endpoint of the user-plane path selected by the gateway selector. The serving gateway has a responder configured to transmit to the switching station, in response to receiving of the first path setting instruction from the switching station, a first path setting instruction response containing identification information of the serving gateway. The path controller of the switching station transmits, via the control-plane path to the first base station, a second path setting instruction containing the identification infoiiiiation of the serving gateway in response to receiving of the first path setting instruction response from the serving gateway. The first base station additionally has a transferor configured to transfer the second path setting instruction to the second base station, the second base station has a path setter configured to set the user-plane path for an uplink by using the identification information of the serving gateway contained in the second path setting instruction transferred from the first base station; a responder configured to transmit, to the first base station, a second path setting instruction response containing identification information of the second base station after the user-plane path for the uplink is set, the transferor of the first base station transfers the second path setting instruction response to the switching station via the control-plane path. The path controller of the switching station transmits, to the serving gateway, a third path setting instruction containing the identification information of the second base station in response receiving of the second path setting instruction response from the first base station. The serving gateway additionally has a path setter configured to set the user-plane path for a downlink by using the identification infoimation of the second base station contained in the third path setting instruction transmitted from the switching station.

In a preferred embodiment of the present invention, the path setter of the serving gateway transmits, to the switching station, a third path setting instruction response after the user-plane path for the downlink is set, and the path controller of the switching station, in a case in which a user-plane path via the first base station has been established, determines whether to release the user-plane path in response to receiving of the third path setting instruction response, and, in a case in which the user-plane path is to be released, controls the first base station and the switching station so as to release the user-plane path.

In a preferred embodiment of the present invention, the first base station additionally has a first interface having plural protocol layers set to the second base station and a second interface having plural protocol layers set to the switching station, and the transferor of the first base station transfers control information from the switching station to the second base station and transfers control information from the second base station to the switching station by rewriting the identification information of a destination node corresponding to any one of the plural protocol layers.

In a preferred embodiment of the present invention, the transferor of the first base station transfers control information from the switching station to the second base station and transfers control information from the second base station to the switching station by rewriting a tunnel endpoint identifier being identification information corresponding to an S1-AP layer included in the plural protocol layers.

In a preferred embodiment of the present invention, the transferor of the first base station transfers control information from the switching station to the second base station and transfers control information from the second base station to the switching station by rewriting an IP address being identification information corresponding to an IP layer included in the plural protocol layers.

In a preferred embodiment of the present invention, the switching station additionally has a request transmitter configured to transmit a path setting request to the serving gateway to be another endpoint of the user-plane path selected by the gateway selector, in response to receiving of the path setting request transmitted from the first base station, and the serving gateway has a responder configured to transmit to the switching station, in response to receiving of the path setting request from the switching station, a path setting request completion response containing identification information of the serving gateway. The switching station additionally has a response transmitter configured to transmit, in response to receiving of the path setting request completion response from the serving gateway, a path setting request completion response for the first base station, the response containing the identification information of the serving gateway, and the path setting requester of the first base station transmits to the second base station, in response to receiving of the path setting request completion response from the switching station, a path setting request completion response containing the identification information of the serving gateway. The second base station has a path setter configured to set the user-plane path for an uplink by using the identification information of the serving gateway contained in the path setting request transferred from the first base station; and a responder configured to transmit, to the first base station, a path setting request completion response containing identification information of the second base station after the user-plane path for the uplink is set, the path setting requester of the first base station transmits to the switching station, in response to receiving of the path setting request completion response from the second base station, a path change request containing the identification information of the second base station, the request transmitter of the switching station transmits, in response to receiving of the path change request from the first base station, a path change request for the serving gateway. The serving gateway additionally has a path setter configured to set the user-plane path for a downlink by using the identification information of the second base station contained in the path change request transmitted from the switching station.

In a preferred embodiment of the present invention, the path setter of the serving gateway transmits, to the switching station, a path change request completion response after the user-plane path for the downlink is set, and the response transmitter of the switching station transmits to the first base station the path change request completion response from the serving gateway. The first base station additionally has a path releaser configured to, in a case in which a user-plane path via the first base station has been established, determine whether to release the user-plane path in response to receiving of the path change request completion response, and in a case in which the user-plane path is to be released, to control the switching station and the first base station so as to release the user-plane path.

In a preferred embodiment of the present invention, the first base station additionally has a first interface having plural protocol layers set to the second base station and a second interface having plural protocol layers set to the switching station, the first interface is set asymmetrically with the first base station as an upper layer and the second base station as a lower layer, and the second interface is set asymmetrically with the first base station as an upper layer and with the switching station as a lower layer.

Effects of the Invention

According to present invention, it is determined, based on identification information contained in report information transmitted from a user equipment, whether a base station corresponding to the identification information is a second base station. Therefore, it becomes clear whether the base station for which a user-plane path is to be established is a first base station having a C-Plane path to a switching station or is a second base station having no C-Plane path to the switching station, and a radio communication system having a new type of base station (second base station) can be realized.

DESCRIPTION OF EMBODIMENTS

First Embodiment

1(1). Configuration of Radio Communication System

Figure 1:
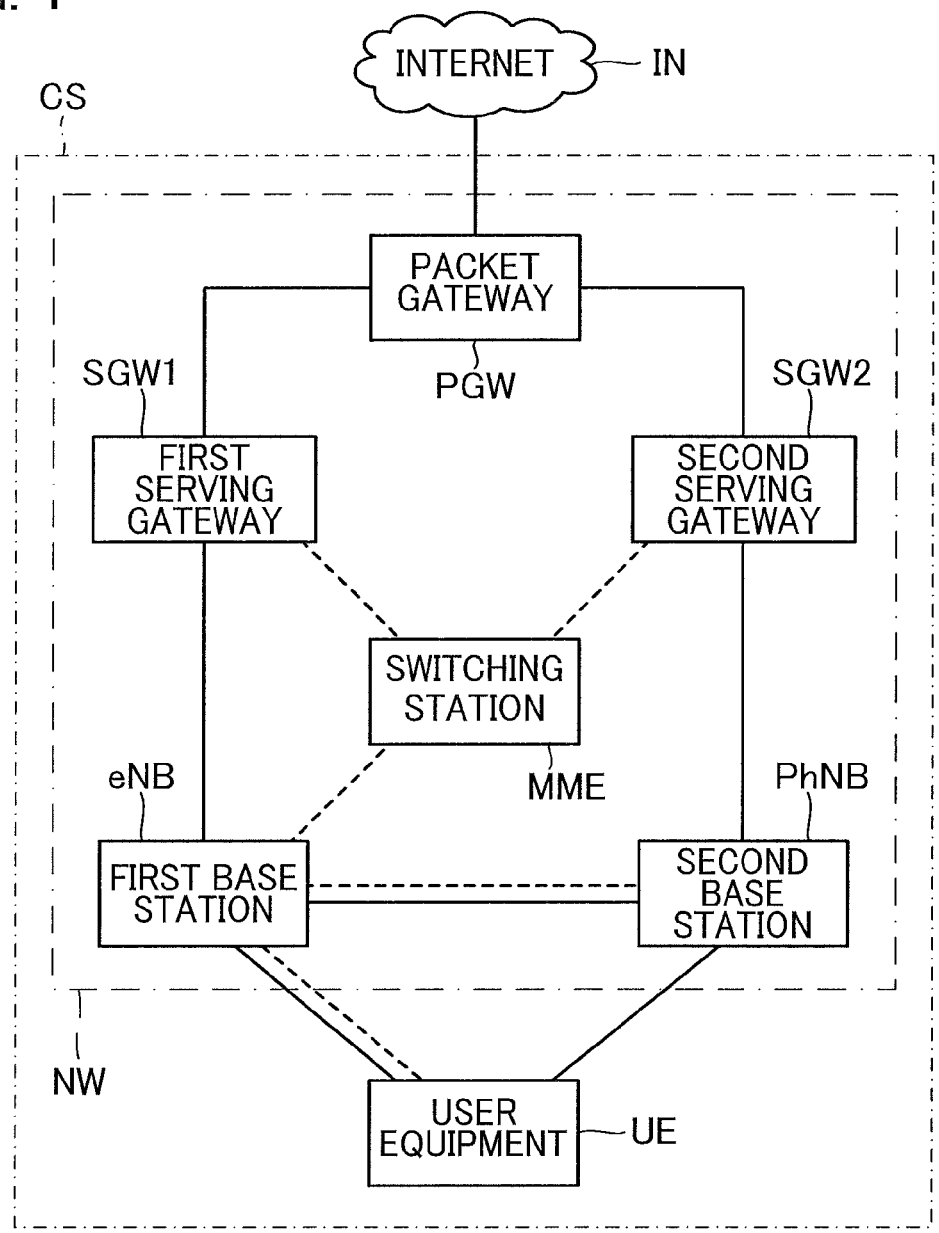
FIG. 1 is a block diagram showing a radio communication system according to a first embodiment of the present invention.

FIG. 1 is a block diagram showing a radio communication system CS according to a first embodiment of the present invention. The radio communication system CS has, as its elements, a user equipment UE, a first base station eNB, a second base station PhNB, a switching station MME, a first serving gateway SGW1, a second serving gateway SGW2, and a packet gateway PGW. A network NW has all elements except for the user equipment UE from among the above elements of the radio communication system CS.

Each element of the radio communication system CS executes communication in accordance with a predetermined access technology such as the LTE/SAE (Long Term Evolution/System Architecture Evolution) prescribed in the 3GPP standard (Third Generation Partnership Project). According to terms defined in the 3GPP standard, the user equipment UE is "User Equipment", the first base station eNB is "evolved Node B, the switching station MME is "Mobile Management Entity", the first serving gateway SGW1 and the second serving gateway SGW2 each are "Serving Gateway", and the packet gateway PGW is Packet Data Network (PDN) Gateway. Also, the second base station PhNB is a new type of base station that differs from the first base station eNB. The details of the second base station will be described later.

According to the present embodiment, description is given of an embodiment in which the radio communication system CS operates in accordance with the LTE/SAE in principle, but it is not intended to limit the scope of the present invention. The present invention is applicable to other radio access technologies when necessary design changes are made.

The user equipment UE is capable of communicating by radio with the first base station eNB and the second base station PhNB. A system of the radio communication between the user equipment UE and each base station (eNB, PhNB) can be freely selected. For example, OFDMA (Orthogonal Frequency Division Multiple Access) may be adopted for the downlink, whereas SC-FDMA (Single-Carrier Frequency Division Multiple Access) may be adopted for the uplink.

The first base station eNB is connected to the second base station PhNB, the switching station MME, and to the first serving gateway SGW1 by wire. The second base station PhNB is connected to the first base station eNB and the second serving gateway SGW2 by wire. A configuration can be employed in which the first base station eNB and the second base station PhNB are connected by radio. The switching station MME is connected, in addition to the first base station eNB, to the first serving gateway SGW1 and the second serving gateway SGW2. The packet gateway PGW is connected to each serving gateway SGW and additionally to the Internet IN, which is an external network with respect to the radio communication system CS. That is, the packet gateway PGW serves as a connection point (access point) with the eternal network.

1(2). Exchanging User Signals and Control Signals

In FIG. 1, the solid line indicates a path used for exchanging user signals (signals showing user data such as voice signals and data signals), and the dashed line indicates a path for exchanging control signals. That is, the solid line indicates a U-Plane (User Plane) interface, and the dashed line indicates a C-Plane (Control Plane) interface. The U-Plane path is established via the U-Plane interface, and the C-Plane path is established via the C-Plane interface. It is to be noted that, as shown in FIG. 1, existing between the first base station eNB and the switching station MME is the C-Plane interface (S1-MME interface), and there is no C-Plane interface between the second base station PhNB and the switching station MME.

Figure 2:
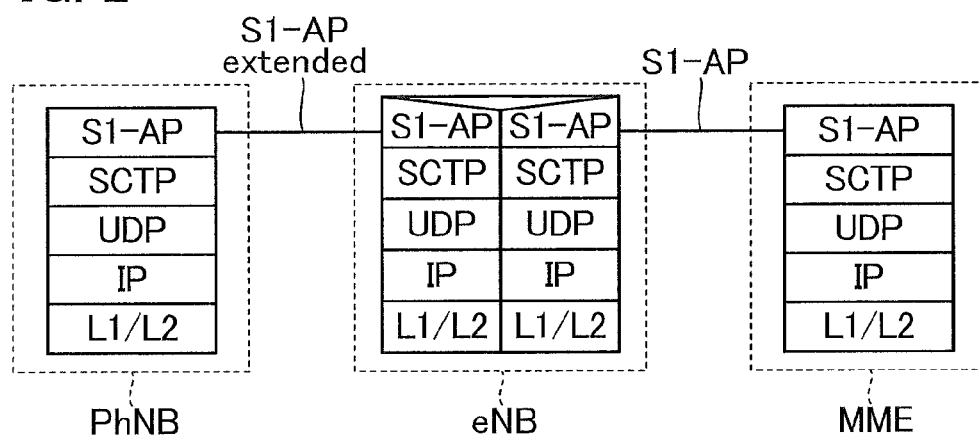
FIG. 2 is a diagram showing an example protocol configuration of an interface of a first base station according to the first embodiment.
Figure 3:
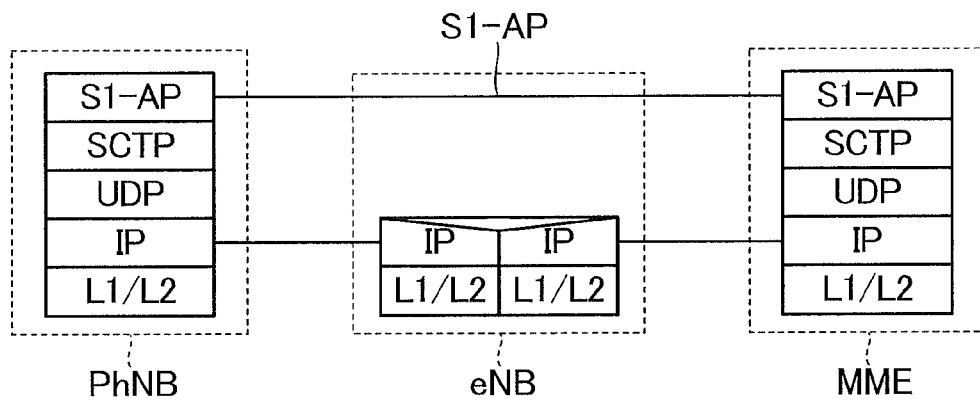
FIG. 3 is a diagram showing another example protocol configuration of an interface of the first base station according to the first embodiment.

In the above interfaces, a protocol configuration of an EPS (Evolved Packet System) prescribed in the 3GPP is employed, in principle. As an interface to be set between the first base station eNB and the second base station PhNB, an extended S1-AP (S1-AP extended) interface which is an extension of an S1-AP interface which is an interface that is set between the switching station MME and the first base station eNB, such as shown in FIG. 2, is preferably employed. Each of the above two interfaces have plural protocol layers. Control signals transmitted from the switching station ACME to the second base station PhNB may be transferred from the first base station eNB to the second base station PhNB at a level of an S1-AP layer (FIG. 2), or alternatively, may be transferred from the first base station eNB to the second base station PhNB at a level of an IP layer (FIG. 3). Furthermore, the control signals may be transferred at a level of another layer. These also apply to control signals transferred from the second base station PhNB to the switching station MME.

In the radio communication system CS, signals are exchanged via a bearer (Bearer), which is a logical path. The bearer is a logical path that is established and released as needed. For the U-Plane, a data radio bearer is established between the user equipment UE and the first base station eNB, or between the user equipment UE and the second base station PhNB. An S1-U bearer S1B is established between the first base station eNB and the first serving gateway SGW1, or between the second base station PhNB and the second serving gateway SGW2. An S5/S8 bearer is established between the first serving gateway SGW1 and the packet gateway PGW, or between the second serving gateway SGW2 and the packet gateway PGW.

Nodes in the radio communication system CS each have unique identification information. The identification information may include an IP address, a TEID (tunnel end point identifier), a network address, etc., of each node. The identification information of the first base station eNB and that of the second base station PhNB each may include a physical cell ID (Physical Cell ID) for identifying a cell C that the base station corresponding to the identification information forms. The IP address is an address value for uniquely identifying each node in the radio communication system CS. TEID is an identifier that identifies an endpoint of a bearer (GTP tunnel) which logically connects nodes. The network address is, in a case in which the radio communication system CS is sectioned into multiple subnets, an address value identifying a subnet the node belongs to. Each node in the radio communication system CS is capable of identifying another node based on the identification information of the other node and of transmitting and receiving signals to and from the identified node.

1(3). Configuration of Each Element

1(3)-1. Configuration of User Equipment

Figure 4:
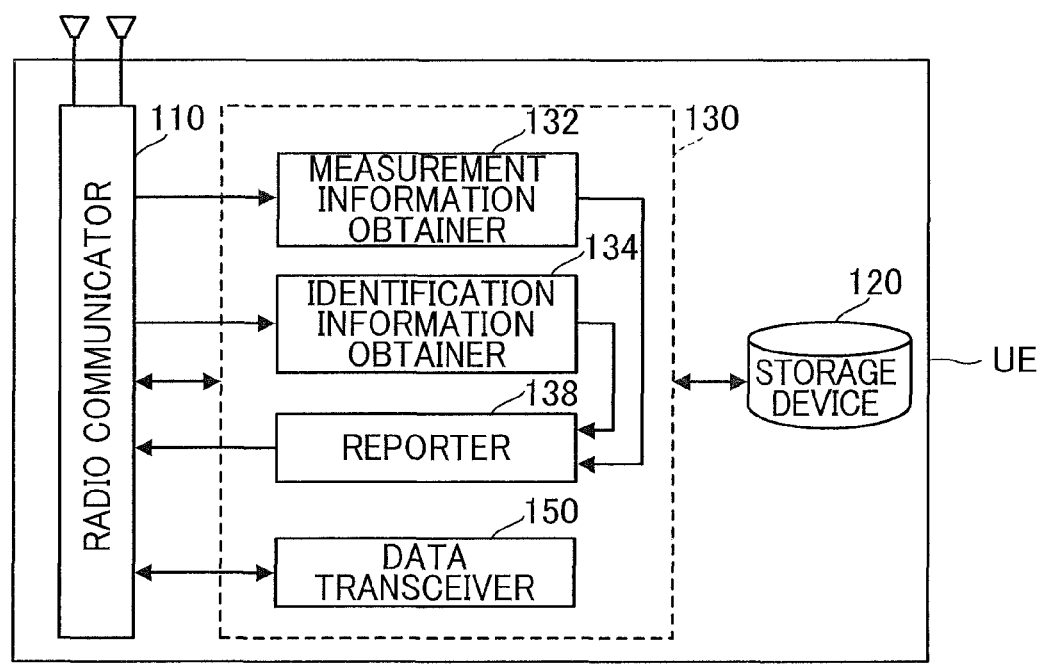
FIG. 4 is a block diagram showing a configuration of a user equipment according to the first embodiment.

FIG. 4 is a block diagram showing a configuration of the user equipment UE according to the first embodiment. The user equipment UE has a radio communicator 110, a storage device 120, and a controller 130. For the purpose of facilitating understanding, output devices for outputting sounds, images, etc., and input devices for accepting user instructions, are omitted. The radio communicator 110 is an element for executing radio communication with the first base station eNB and the second base station PhNB, a transceiver antenna, a reception circuit for receiving radio signals (radio waves) and converting the signals into electrical signals, and a transmission circuit for converting electrical signals such as control signals, user signals, etc., into radio signals (radio waves), for transmission. The controller 130 has a measurement information obtainer 132, an identification information obtainer 134, a reporter 138, and a data transceiver 150. Operation of the measurement information obtainer 132, the identification information obtainer 134, and the reporter 138 will be described later in detail. The data transceiver 150 transmits and receives user signals via the data radio bearer, to and from each base station (eNB, PhNB). The controller 130 and the above each element included in the controller 130 are functional blocks embodied by a CPU (Central Processing Unit, not shown) of the user equipment UE executing a computer program stored in the storage device 120 to function in accordance with the computer program.

1(3)-2. Configuration of First Base Station

Figure 5:
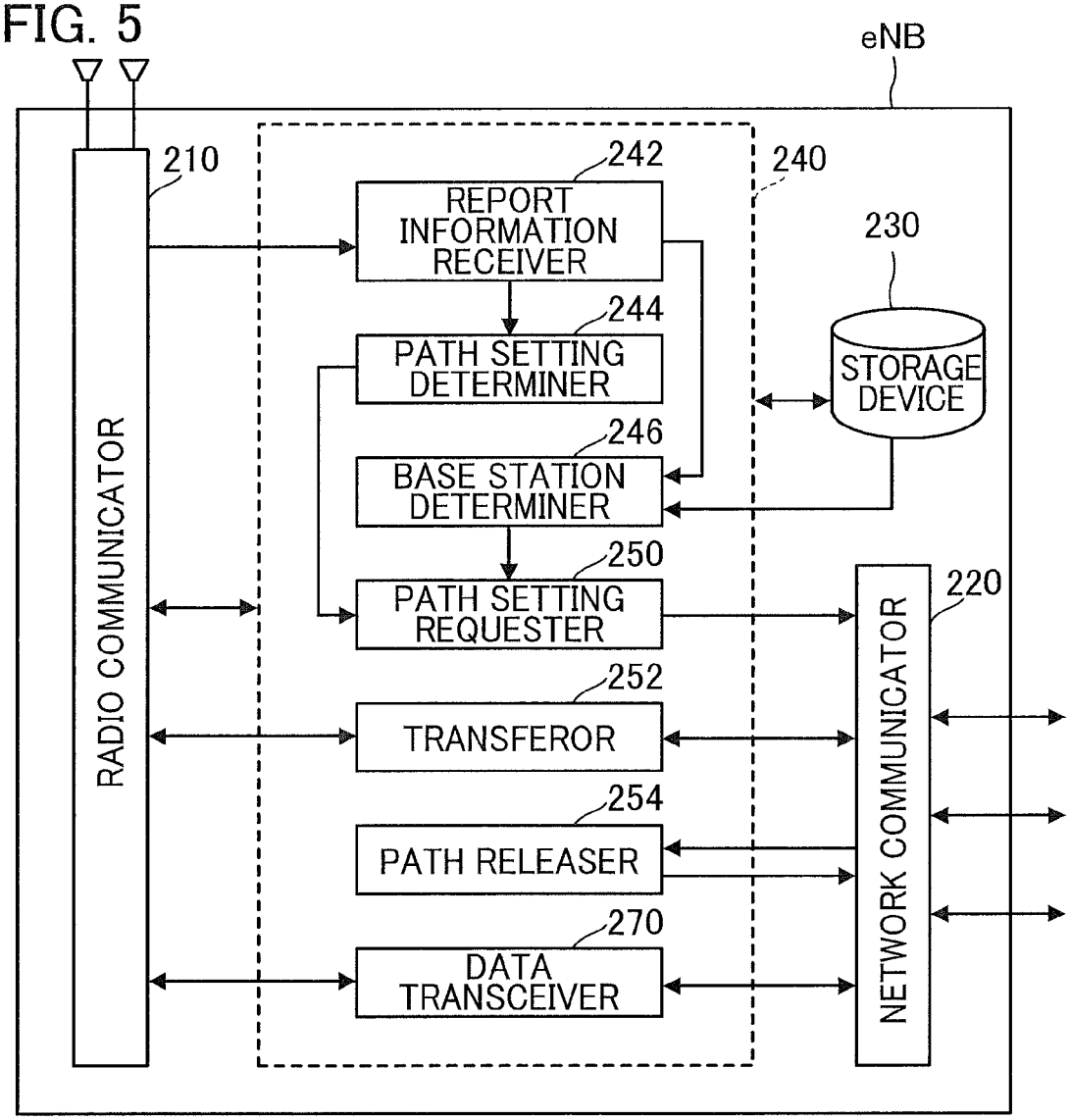
FIG. 5 is a block diagram showing a configuration of the first base station according to the first embodiment.
Figure 6:
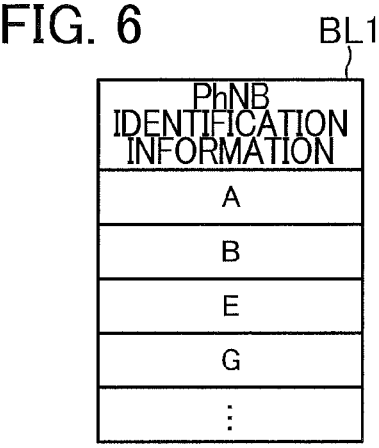
FIG. 6 is a diagram showing an example base station list.

FIG. 5 is a block diagram showing a configuration of the first base station eNB of the first embodiment. The first base station eNB includes a radio communicator 210, a network communicator 220, a storage device 230, and a controller 240. The radio communicator 210 is an element for performing radio communication with the user equipment UE, and has a configuration similar to the radio communicator 110 of the user equipment UE. The network communicator 220 is an element for communicating with other nodes in the network NW (second base station PhNB, switching station MME, serving gateway SGW, etc.), and transmits and receives electrical signals to and from other nodes. The storage device 230 stores information about the communication control, a base station list BL1, in particular, in which pieces of identification information of the second base stations PhNB such as shown in FIG. 6 are listed (details will be given below). The controller 240 has a report information receiver 242, a path setting determiner 244, a base station determiner 246, a path setting requester 250, a transferor 252, a path releaser 254, and a data transceiver 270. The data transceiver 270 transmits and receives (relays) user signals to and from the user equipment UE via the data radio bearer and transmits and receives (relays) user signals to and from the first serving gateway SGW1 through the S1-U bearer S1B. The operation of other elements, which the controller 240 includes, will be described below. The controller 240 and the above each element included in the controller 240 are functional blocks embodied by a CPU (not shown) of the first base station eNB executing a computer program stored in the storage device 230 to function in accordance with the computer program.

1(3)-3. Configuration of Second Base Station

Figure 7:
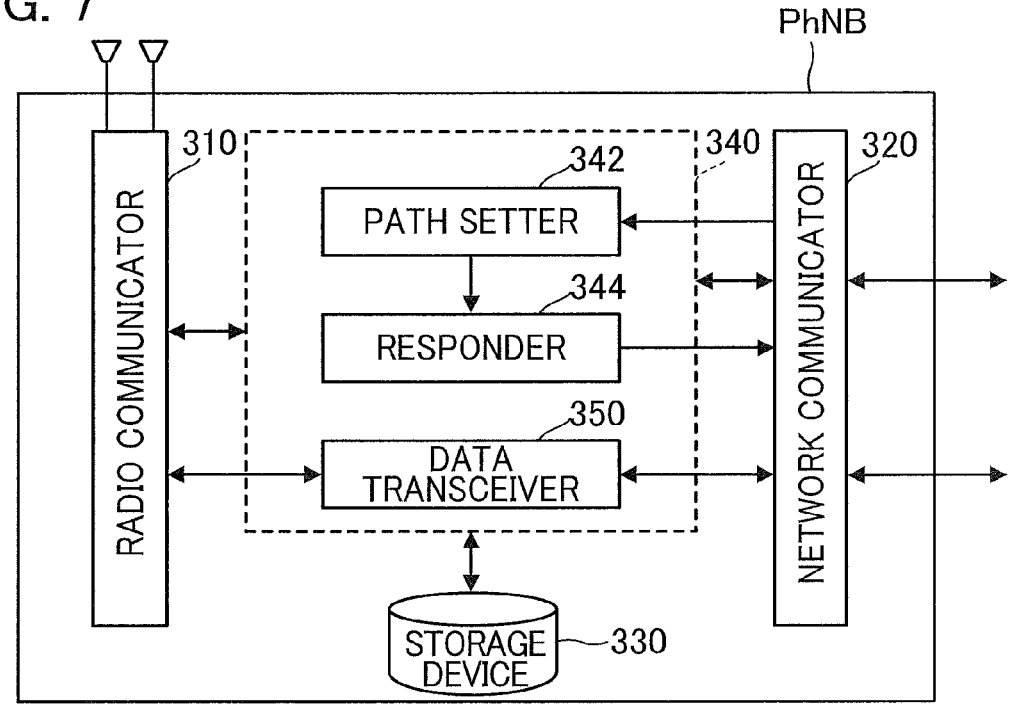
FIG. 7 is a block diagram showing a configuration of a second base station according to the first embodiment.

FIG. 7 is a block diagram showing a configuration of the second base station PhNB of the first embodiment. The second base station PhNB includes a radio communicator 310, a network communicator 320, a storage device 330, and a controller 340. The radio communicator 310 is an element for performing radio communication with the user equipment UE, and has a configuration similar to the radio communicator 210 of the first base station eNB. The network communicator 320 is an element for communicating with the first base station eNB and the second serving gateway SGW2, and transmits and receives electrical signals to and from other nodes. The storage device 330 has information about communication control. The controller 340 has a path setter 342, a responder 344, and a data transceiver 350. The data transceiver 350 transmits and receives (relays) user signals to and from the user equipment UE via the data radio bearer and transmits and receives (relays) user signals to and from the second serving gateway SGW2 through the S1-U bearer S1B. The operation of other elements that the controller 340 includes will be described below. The controller 340 and the above each element included in the controller 340 are functional blocks embodied by a CPU (not shown) of the second base station PhNB executing a computer program stored in the storage device 330 to function in accordance with the computer program.

1(3)-4. Configuration of Switching Station

Figure 8:
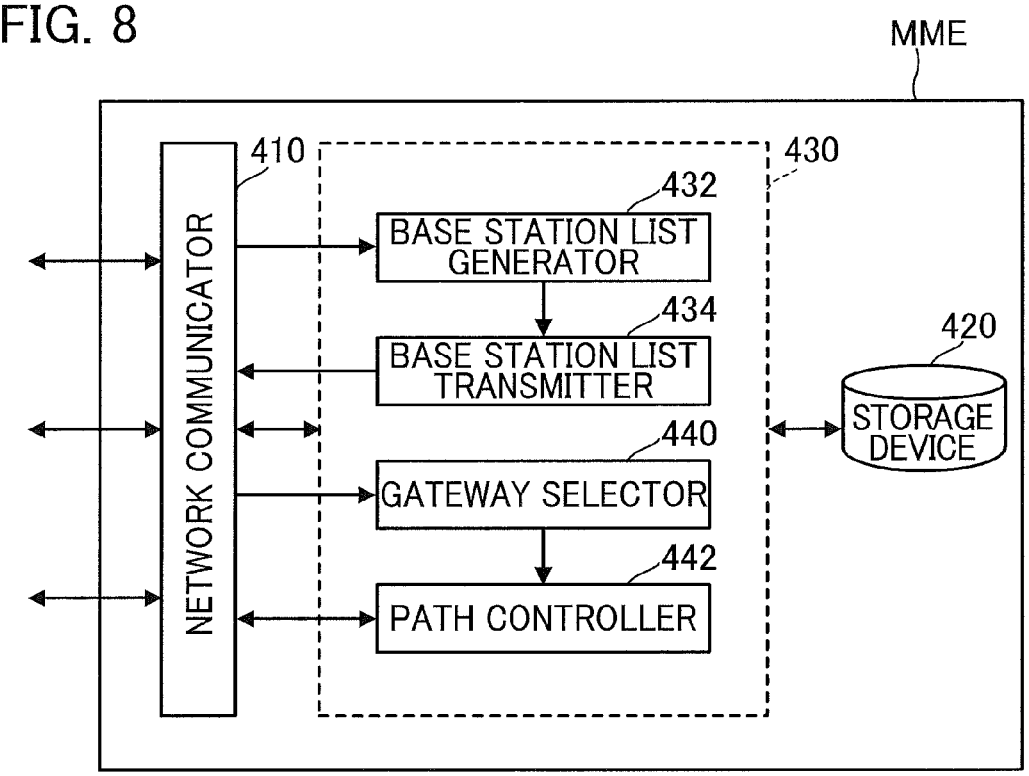
FIG. 8 is a block diagram showing a configuration of a switching station according to the first embodiment.

FIG. 8 is a block diagram showing a configuration of the switching station MME according to the first embodiment. The switching station MME includes a network communicator 410, a storage device 420, and a controller 430. The network communicator 410 is an element for performing communication with other nodes in the network NW (the serving gateway SGW (SGW1, SGW2), the first base station eNB, etc.), and has a configuration similar to the network communicator 220 of the first base station eNB. The storage device 420 stores information about communication control. The controller 430 has a base station list generator 432, a base station list transmitter 434, a gateway selector 440, and a path controller 442. The operation of other elements that the controller 430 includes will be described below. The controller 430 and the above each element included in the controller 430 are functional blocks embodied by a CPU (not shown) of the switching station MME executing a computer program stored in the storage device 420 to function in accordance with the computer program.

1(3)-5. Configuration of Serving Gateway

Figure 9:
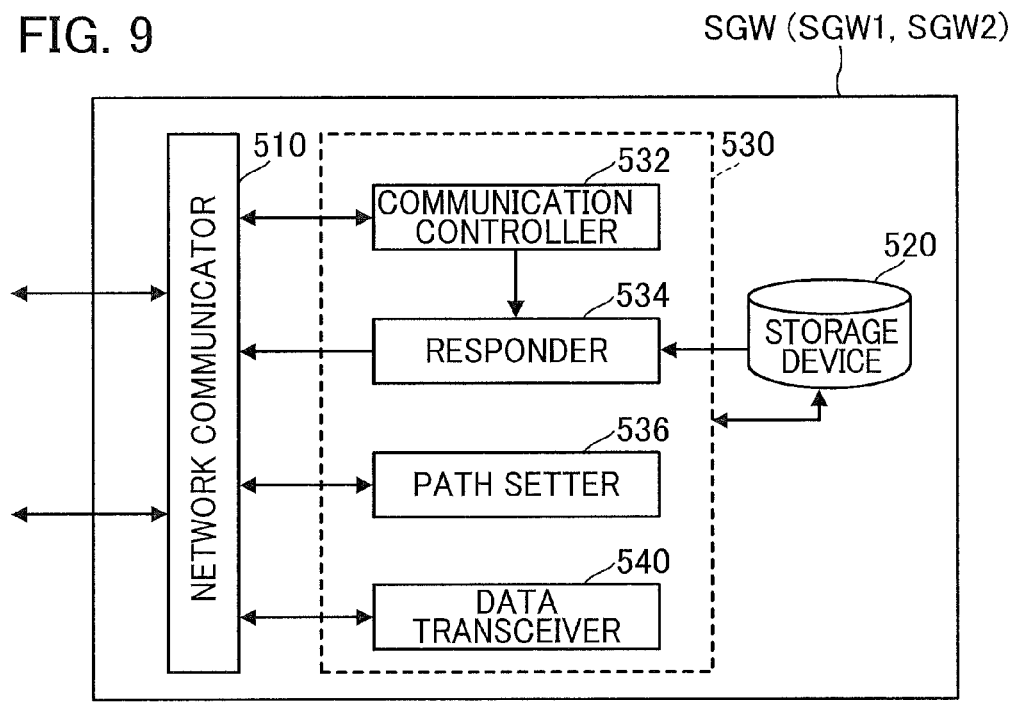
FIG. 9 is a block diagram showing a configuration of a serving gateway according to the first embodiment.

FIG. 9 is a block diagram showing a configuration of the serving gateway SGW (SGW1, SGW2) of the first embodiment. The serving gateway SGW includes a network communicator 510, a storage device 520, and a controller 530. The network communicator 510 is an element for performing communication with other nodes in the network NW (first base station eNB or second base station PhNB, switching station MME, packet gateway PGW, etc.), and has a configuration similar to the network communicator 220 of the first base station eNB. The storage device 520 stores information about communication control. The controller 530 has a communication controller 532, a responder 534, a path setter 536, and a data transceiver 540. The data transceiver 540 transmits and receives (relays) user signals to and from the first base station eNB or the second base station PhNB via the S1-U bearer S1B, and transmits and receives (relays) user signals to and from the packet gateway PGW through the S5/S8 bearer. The operation of other elements which the controller 530 includes will be described below. The controller 530 and the above each element included in the controller 530 are functional blocks embodied by a CPU (not shown) of the serving gateway SGW executing a computer program stored in the storage device 520 to function in accordance with the computer program.

1(3)-6. Configuration of Packet Gateway

Figure 10:
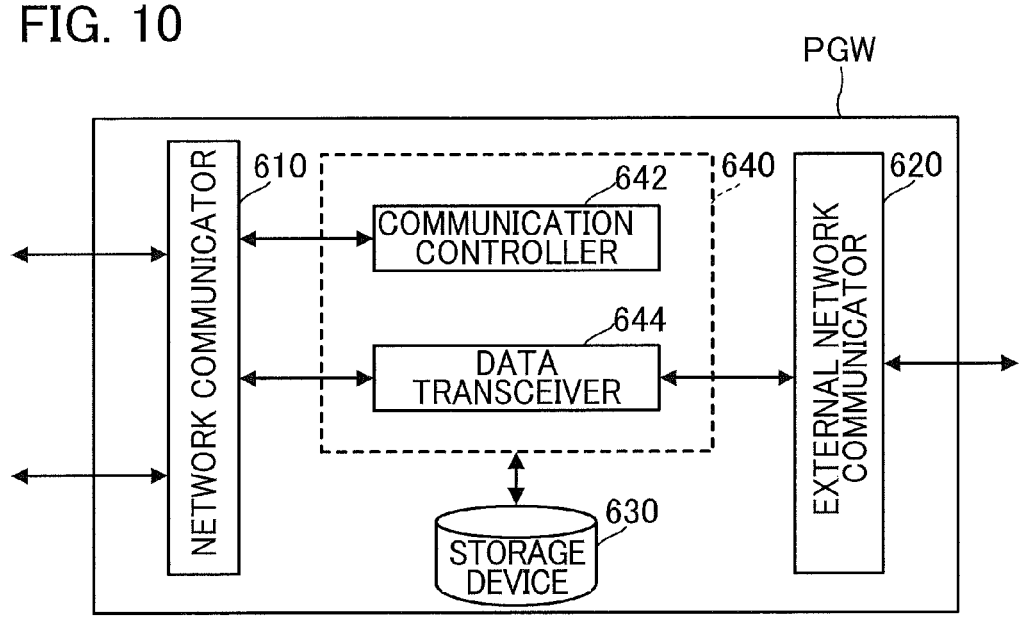
FIG. 10 is a block diagram showing a configuration of a packet gateway according to the first embodiment.

FIG. 10 is a block diagram showing a configuration of the packet gateway PGW of the first embodiment. The packet gateway PGW includes a network communicator 610, an external network communicator 620, a storage device 630, and a controller 640. The network communicator 610 is an element for communicating with other nodes in the network NW (serving gateway SGW, etc.), and transmits and receives electrical signals to and from other nodes. The external network communicator 620 is an element for performing communication with the Internet IN and performs protocol conversion of electrical signals (data signals) as needed. The storage device 630 stores information about communication control. The controller 640 has a communication controller 642 and a data transceiver 644. The communication controller 642 is an element for performing communication control of the radio communication system CS and transmits and receives control signals to and from the serving gateway SGW (SGW1, SGW2), etc., through the network communicator 610. The data transceiver 634 transmits (relays) data signals to the Internet IN (an external server in the Internet IN) through the external network communicator 620, the data signals being received through the network communicator 610 from the user equipment UE as the sender. The data transceiver 634 also transmits (relays) data signals received through the external network communicator 620 from the Internet IN (an external server in the Internet IN), to the user equipment UE through the network communicator 610. The controller 640 and the above each element included in the controller 640 are functional blocks embodied by a CPU (not shown) of the packet gateway PGW executing a computer program stored in the storage device 630 to function in accordance with the computer program.

1(4). Selection of Serving Gateway and Setting of S1-U Bearer

Figure 11:
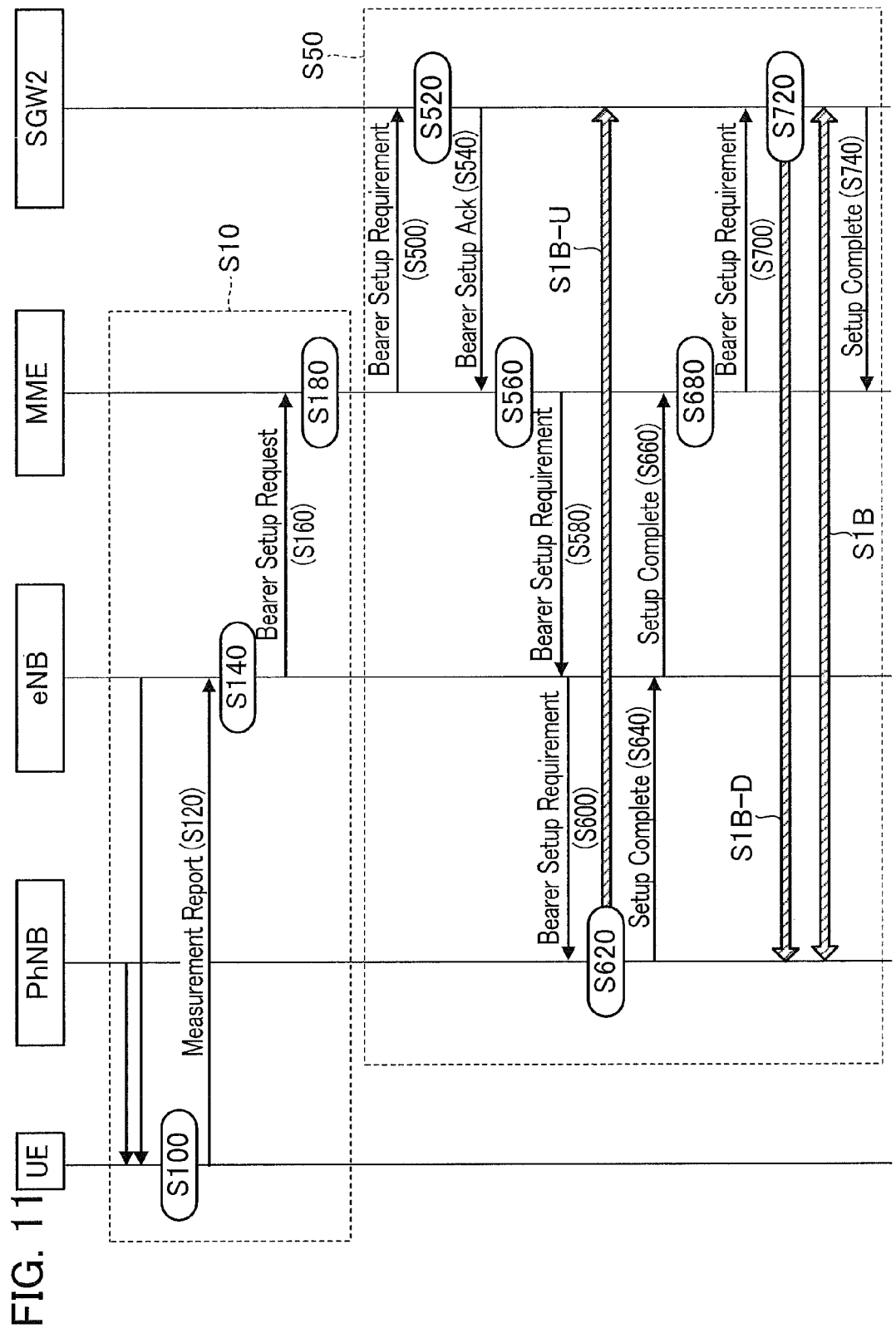
FIG. 11 is an operation flow showing an example of a selection of a serving gateway and setting of an S1-U bearer according to the first embodiment.

Description will be given of an example operation of a selection of a serving gateway (S10) and setting of an S1-U bearer (S50) according to the first embodiment, with reference to FIG. 11. In the example shown in FIG. 11, we assume that an S1-U bearer S1B has been established between the first base station eNB and the first serving gateway SGW1. We further assume that a data radio bearer corresponding to the above S1-U bearer S1B has been established between the first base station eNB and the user equipment UE, and that an S5/S8 bearer corresponding to the above S1-U bearer S1B has been established between the first serving gateway SGW1 and the packet gateway PGW. Therefore, under the above assumptions, the user equipment UE performs communication with the Internet IN via the first base station eNB, the first serving gateway SGW1, and the packet gateway PGW, in the first place. For the C-Plane, we assume that a signaling radio bearer has been established between the first base station eNB and the user equipment UE. Thus, as it is understood, the user equipment UE, at the beginning of the flow in FIG. 11, is radio-connected to the first base station eNB.

The radio communicator 110 of the user equipment UE receives radio signals from each neighboring base station (first base station eNB, second base station PhNB). The measurement information obtainer 132 of the user equipment UE obtains measurement information about reception quality of radio signals received from each base station (S100). More specifically, the measurement information obtainer 132 of the user equipment UE obtains, as measurement information, the reception power (or reception quality) of a reference signal included in radio signals which each base station (first base station eNB, second base station PhNB) transmits. Furthermore, the identification information obtainer 134 of the user equipment UE obtains identification information (physical cell ID) of a base station that is contained in the radio signals that each base station transmits. In other words, the identification information obtainer 134 of the user equipment UE obtains identification infomation of a base station corresponding to each received piece of measurement information (S100). Subsequently, the reporter 138 of the user equipment UE transmits a Measurement Report message (report information) containing the measurement information and identification information obtained with regard to every base station, to the first base station to which the user equipment is being radio-connected (S120).

The report information receiver 242 of the first base station eNB receives the Measurement Report message transmitted from the user equipment UE. The report information receiver 242 supplies, to the path setting determiner 244, the measurement information contained in the Measurement Report message and also supplies, to the base station determiner 246, the identification information contained in the Measurement Report message. The path setting determiner 244 determines, based on the measurement information, whether to set an S1-U bearer S1B having, as one endpoint, a base station corresponding to the measurement information, and supplies the determination result to the path setting requester 250 (S140). In this example, we assume that the path setting determiner 244 determines that an S1-U bearer S1B having the second base station PhNB as one endpoint should be set, based on the reception power of radio signals from the second base station PhNB being greater than the reception power of radio signals from the first base station eNB. Furthermore, the base station determiner 246 determines, based on identification information of a base station, whether a base station corresponding to the identification information is the second base station PhNB, by using the base station list BL1 stored in the storage device 230 and supplies the determination result to the path setting requester 250 (S140). The base station list BL1 is a list of storing pieces of identification information of the second base stations PhNB. Therefore, the base station determiner 246 can determine a base station to be the second base station PhNB based on identification information of a certain base station that is stored by the base station list BL1.

The path setting requester 250 of the first base station eNB transmits, to the switching station MME through the C-Plane path, a Bearer Setup Request message (path setting request) requiring that the S1-U bearer S1B be set when the path setting determiner 244 determines that the S1-U bearer S1B should be set and when the base station determiner 246 determines a base station which should be one endpoint of the S1-U bearer S1B to be the second base station PhNB (S160). The gateway selector 440 of the switching station MME selects a serving gateway SGW which is to be another endpoint of the S1-U bearer S1B, which the Bearer Setup Request message requires setting, the message having been received from the first base station eNB (S180). The criteria for selection of a serving gateway SGW can be freely selected. For example, the closeness of the logical distance with the second base station PhNB or the congestion degree of the serving gateway SGW, etc., (or a combination thereof) can be adopted as criteria for selection. In this example, it is assumed that the gateway selector 440 selects the second serving gateway SGW2 connected to the second base station PhNB as another endpoint of the S1-U bearer S1B.

Hereinafter, the serving gateway selection operation of the first embodiment from the above-mentioned Steps S100 to S180 is collectively referred to as Step S10.

The path controller 442 of the switching station MME transmits a Bearer Setup Requirement message (first path setting instruction) to the second serving gateway SGW2 which is to become another endpoint of the above S1-U bearer S1B, with the second serving gateway SGW2 having been selected by the gateway selector 440, and the Bearer Setup Requirement message instructing that the S1-U bearer S1B is set between the second serving gateway SGW2 and the second base station PhNB (S500). The communication controller 532 of the second serving gateway SGW2, upon receiving the Bearer Setup Requirement message from the switching station MME, controls the responder 534 (S520) so as to transmit, to the switching station MME, a Bearer Setup Ack message (first path setting instruction reply) containing the identification information (TEID and the like) of the second serving gateway SGW2 (S540).

The path controller 442 of the switching station MME, upon receiving the Bearer Setup Ack message from the second serving gateway SGW2, generates a Bearer Setup Requirement message (second path setting instruction) containing the identification information of the second serving gateway SGW2 (S560), and transmits the message to the first base station eNB through the C-Plane path (S580). The transferor 252 of the first base station eNB transfers, to the second base station PhNB, the Bearer Setup Requirement message transmitted from the switching station MME (S600). More specifically, the transferor 252 rewrites the identification information of a destination node contained in the Bearer Setup Requirement message from the identification information of the first base station eNB to the identification information of the second base station PhNB. The identification information of the above destination node may be identification information of either protocol layer. For example, the identification information of the destination node may be the tunnel end point identifier, which is identification information of the S1-AP layer, or may be the IP address, which is identification information of the IP layer (FIG. 2, FIG. 3).

The path setter 342 of the second base station PhNB sets an uplink S1-U bearer S1B-U by using the identification information of the second serving gateway SGW2 contained in the Bearer Setup Requirement message transferred from the first base station eNB (S620). When the uplink S1-U bearer S1B-U is set, the responder 344 transmits, to the first base station eNB, a Setup Complete message (second path setting instruction response) containing the identification information of the second base station PhNB, with the message indicating the above bearer setting having been completed (S640). The transferor 252 of the first base station eNB transfers the Setup Complete message transmitted from the second base station PhNB to the switching station MME through the C-Plane path (S660).

The path controller 442 of the switching station MME, upon receiving the Setup Complete message transferred from the first base station eNB, generates a Bearer Setup Requirement message (third path setting instruction) that contains the identification information of the second base station PhNB contained in the Setup Complete message (S680), and transmits the message to the second serving gateway SGW2 (S700). The path setter 536 of the second serving gateway SGW2 uses the identification information of the second base station PhNB contained in the Bearer Setup Requirement message transmitted from the switching station MME, to set a downlink S1-U bearer S1B-D (S720). The path setter 536 of the second serving gateway SGW2, when the downlink S1-U bearer S1B-D is set, transmits a Setup Complete message (third path setting instruction response) to the switching station MME (S740). With the above operation, the S1-U bearer S1B, which is bidirectionally communicable, is set. It is to be noted that, even after the setting of the S1-U bearer S1B, the C-Plane path (signaling radio bearer) established between the user equipment UE and the first base station eNB is maintained.

Hereinafter, the S1-U bearer setting operation of the first embodiment from the above Steps S500 to S740 is collectively referred to as Step S50.

1(5). Effects of the Present Embodiment

According to the first embodiment described in the foregoing, a radio communication system having the second base station PhNB, which is a new type differing from the first base station eNB, is realized. According to the above configuration, it is determined, based on identification information contained in the report information transmitted from the user equipment UE, whether a base station corresponding to the identification information is the second base station PhNB. Therefore, it becomes clear whether the base station, for which the S1-U bearer S1B is to be established, is the first base station eNB having the C-Plane path to the switching station MME or the second base station PhNB which does not have the C-Plane path to switching station MME, and this is made to be used for the following determination.

Furthermore, when it is determined that an S1-U bearer S1B should be established, and when one endpoint of the S1-U bearer S1B is the second base station PhNB, the switching station MME selects a serving gateway SGW to which the second base station PhNB is to be connected (an element to which the S1-U bearer S1B is to be set). Therefore, a connection point (an element to which the S1-U bearer S1B is to be set) that is suitable for the second base station PhNB, which is the endpoint of the S1-U bearer S1B, can be selected.

Furthermore, the switching station MME takes the initiative in controlling the second serving gateway SGW2 and the second base station PhNB, to establish the S1-U bearer S1B. The switching station MME transmits and receives control signals to and from the second base station PhNB via the first base station eNB. Therefore, with the above configuration, even though the C-Plane path does not exist between the second base station PhNB and the switching station MME, the U-Plane path to the second base station PhNB can be set.

Second Embodiment

The second embodiment of the present invention is described below. In each mode illustrated below, for elements for which action and function are the same as those of the first embodiment, the reference numerals used in the foregoing description will also be used, and description thereof will be omitted as appropriate.

In the first embodiment, the switching station MME selects a serving gateway SGW to which the S1-U bearer S1B should be set (S10). Furthermore, the S1-U bearer S1B is set with the initiative by the switching station MME (S50). In the second embodiment, the first base station eNB selects a serving gateway SGW to which the S1-U bearer S1B should be set (S12). Furthermore, the S1-U bearer S1B is set with the initiative by the first base station eNB (S52).

2(1). Configuration of Each Element

2(1) -1. Configuration of First Base Station

Figure 12:
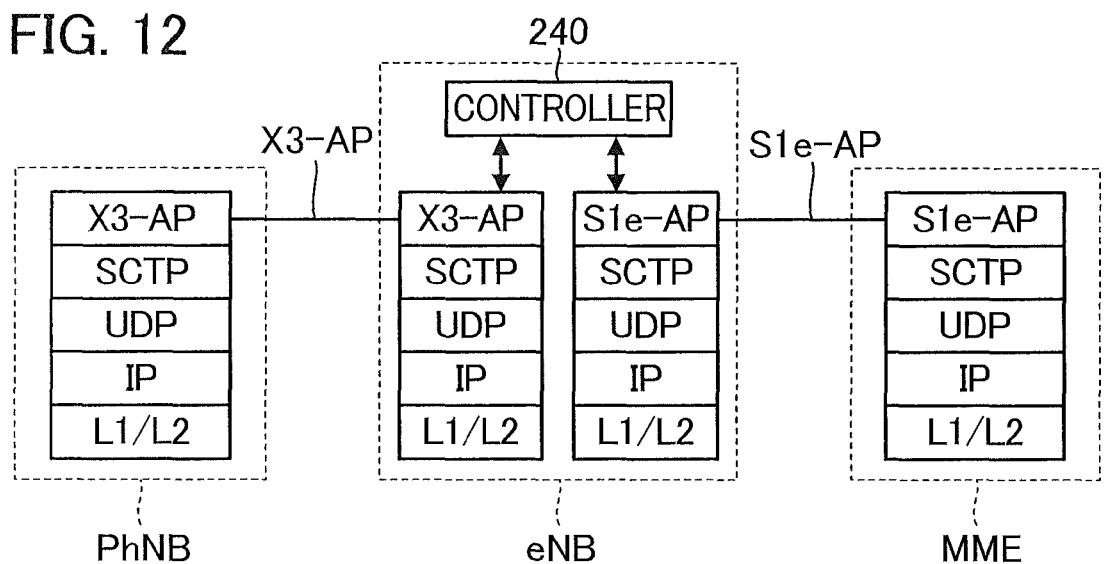
FIG. 12 is a diagram showing an example protocol configuration of an interface of a first base station according to a second embodiment.

FIG. 12 is a diagram showing an example interface of the first base station eNB according to the second embodiment. As an interface to be set between the first base station eNB and the second base station PhNB, an interface such as an X3-AP interface which is a modification of a conventional X2-AP interface that is set between the first base stations eNB is preferably employed. The X3-AP interface is an interface having plural protocol layers and is set asymmetrically with the first base station eNB as an upper layer and with the second base station PhNB as a lower layer. Furthermore, as an interface to be set between the first base station eNB and the switching station MME, an interface such as an S1e-AP interface which is a modification of a conventional S1-AP interface that is set asymmetrically with the switching station MATE as an upper layer and with the first base stations eNB as a lower layer is preferably employed. The S1e-AP interface is set asymmetrically with the first base station eNB as an upper layer and with the switching station MME as a lower layer (i.e., the opposite of the S1-AP interface). Stated another way, the above-described interface of the second embodiment is controlled under the initiative of the controller 240 of the first base station eNB.

Figure 13:
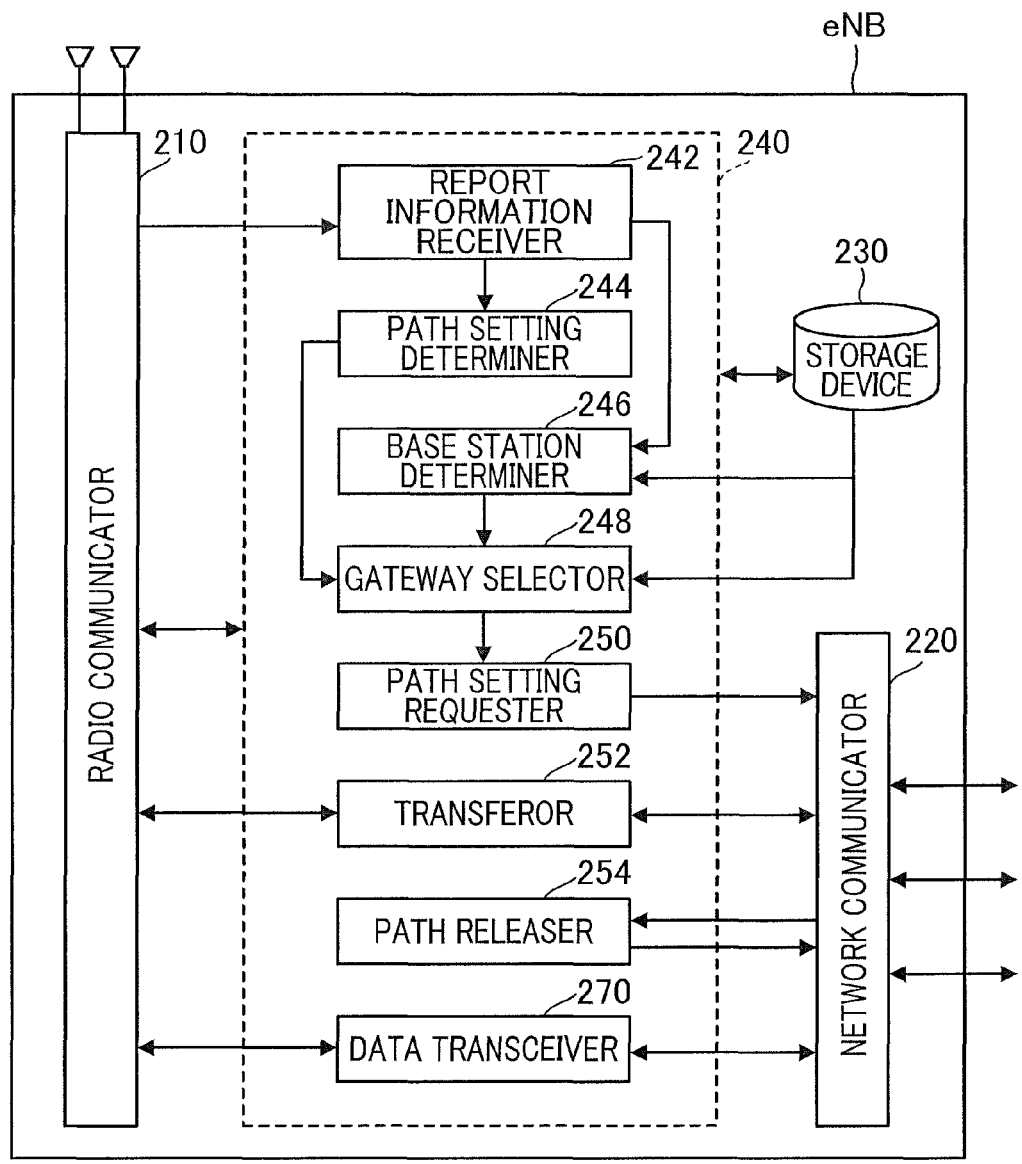
FIG. 13 is a block diagram showing a configuration of the first base station of the second embodiment.

FIG. 13 is a block diagram showing a configuration of the first base station eNB of the second embodiment. The controller 240 of the first base station eNB of the second embodiment additionally has a gateway selector 248. The gateway selector 248 is a functional block embodied by execution of a computer program like other elements in the controller 240. Furthermore, the storage device 230, which the first base station eNB of the second embodiment has, stores a base station list BL2 which stores, in correspondence with each other, identification information of the second base station PhNB and identification information of the serving gateway SGW, which is, with respect to the S1-U bearer S1B having the second base station PhNB as one endpoint, to be another endpoint, as shown in FIG. 14.

2(1) -2. Configuration of Switching Station

Figures 14, 15:
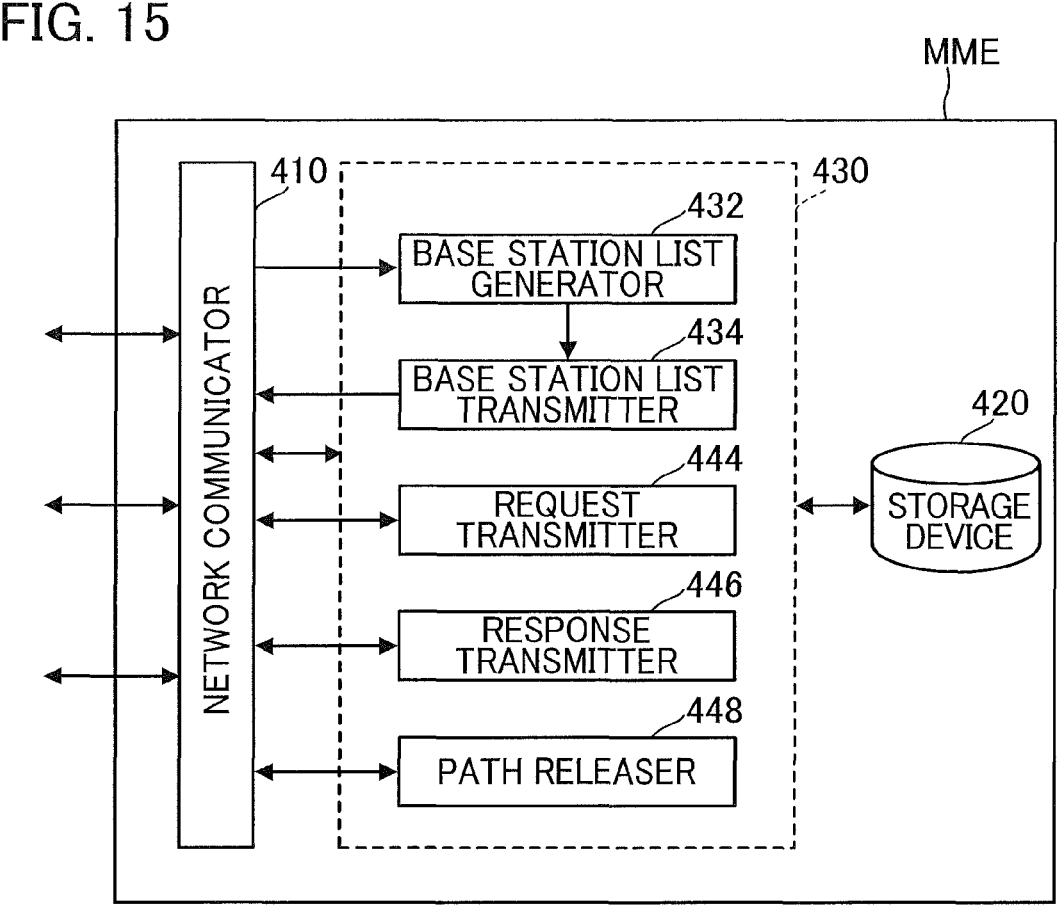
FIG. 14 is a diagram showing an example base station list.
FIG. 15 is a block diagram showing a configuration of a switching station according to the second embodiment.

FIG. 15 is a block diagram showing a configuration of the switching station MME according to the second embodiment. The controller 430 of the switching station MME of the second embodiment has a request transmitter 444, a response transmitter 446, and a path releaser 448, instead of the gateway selector 440 and the path controller 442, which the controller 430 of the first embodiment has. The request transmitter 444, the response transmitter 446, and the path releaser 448 are functional blocks embodied by execution of a computer program like other elements in the controller 430.

2(2). Selection of Serving Gateway and Setting of S1-U Bearer

Figure 16:
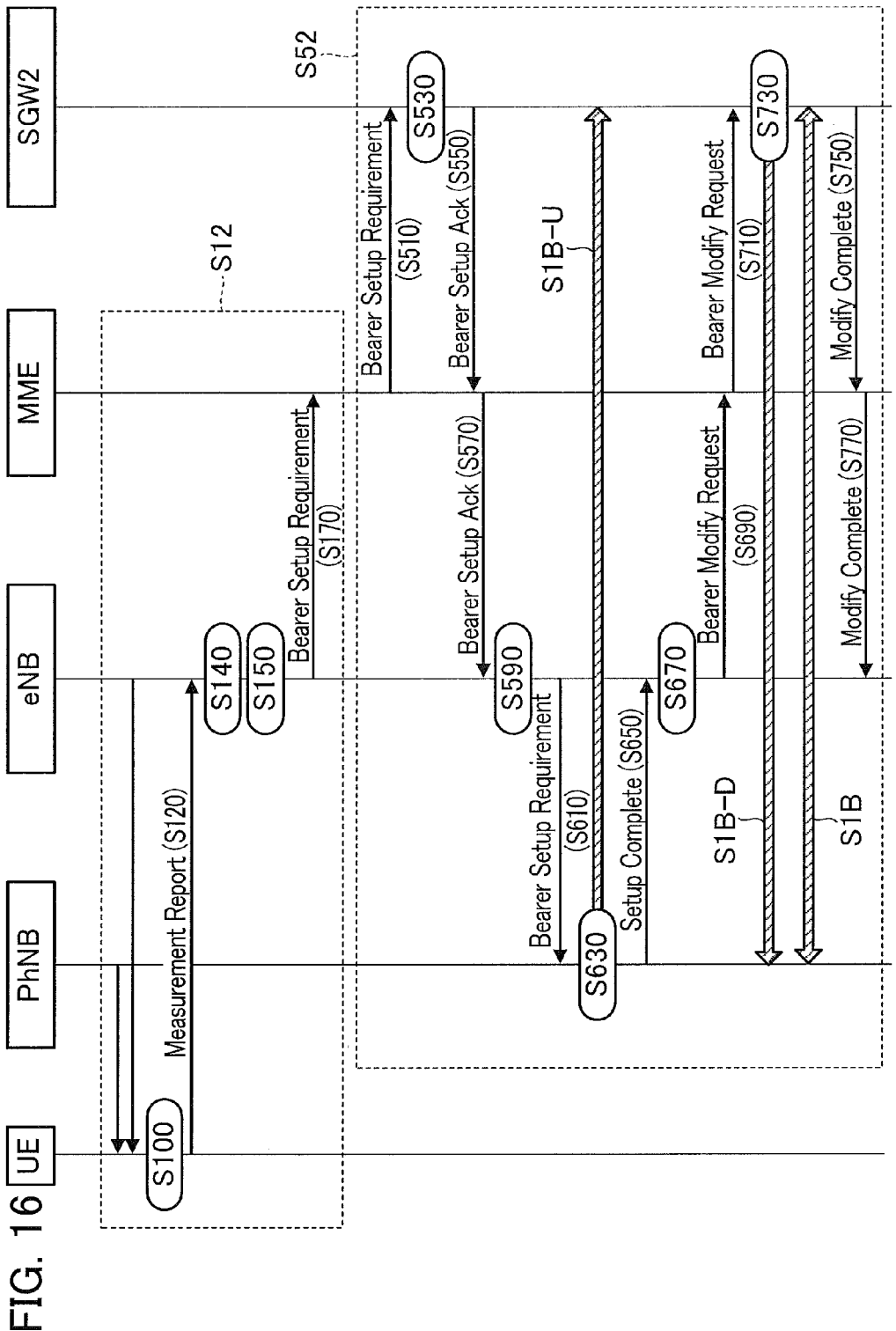
FIG. 16 is an operation flow showing an example of a selection of a serving gateway and setting of an S1-U bearer according to the second embodiment.

Description will be given of an example operation of a selection of the serving gateway and setting of the S1-U bearer according to the second embodiment, with reference to FIG. 16. The initial assumptions with respect to the U-Plane bearer and the C-Plane bearer are similar to those of FIG. 11. The user equipment HE obtains measurement information and identification information in a manner similar to that in the first embodiment (S100). The user equipment UE (the reporter 138) transmits a Measurement Report message (report information) containing the obtained measurement information and identification information to the first base station eNB to which the user equipment is being radio-connected (S120). After the first base station eNB (report information receiver 242) receives the Measurement Report message, the measurement information is supplied to the path setting determiner 244, and the identification information is supplied to the base station determiner 246.

The path setting determiner 244 determines, based on the measurement information, whether to set an S1-U bearer S1B having, as one endpoint, a base station corresponding to the measurement information, and supplies the determination result to the gateway selector 248 (S140). In this example, similarly to what is described previously, we assume that the path setting determiner 244 determines that an S1-U bearer S1B having the second base station PhNB as one endpoint should be set. Furthermore, the base station determiner 246 determines, based on identification information of a base station, whether a base station corresponding to the identification information is the second base station PhNB, by using the base station list BL2 stored in the storage device 230 and supplies the determination result to the gateway selector 248 (S140). As described earlier, because the base station list BL2 stores the identification information of the second base station PhNB, the base station determiner 246 can determine a base station to be the second base station PhNB based on identification information of a certain base station being stored in the base station list BL2.

In a case in which the path setting determiner 244 determines that an S1-U bearer S1B should be set, when the base station determiner 246 determines that one endpoint of the S1-U bearer S1B is the second base station PhNB, the gateway selector 248 of the first base station eNB selects a serving gateway SGW to be another endpoint of the S1-U bearer S1B, by using the base station list BL2, and supplies, to the path setting requester 250, information indicating the selected serving gateway SGW (S150). As described earlier, the gateway selector 248 can select a serving gateway SGW corresponding to the second base station PhNB determined by the base station determiner 246 because the base station list BL2 stores, in correspondence with each other, pieces of identification information of the second base stations PhNB and pieces of identification information of the serving gateways SGW. In this example, it is assumed that the gateway selector 248 selects the second serving gateway SGW2 connected to the second base station PhNB as another endpoint of the S1-U bearer S1B. The path setting requester 250 of the first base station eNB transmits, to the switching station MME through the C-Plane path, a Bearer Setup Requirement message (path setting request) requiring setting of the S1-U bearer S1B between the second serving gateway SGW2 that the gateway selector 248 has selected and the second base station PhNB (S170).

Hereinafter, the serving gateway selection operation of the second embodiment from the above-mentioned Steps S100 to S170 is collectively referred to as Step S12.

The request transmitter 444 of the switching station MME, upon receiving a Bearer Setup Requirement message transmitted from the path setting requester 250 of the first base station eNB, transmits the Bearer Setup Requirement message for the second serving gateway SGW2 which is to become another endpoint of the above S1-U bearer S1B, with the second serving gateway SGW2 being selected by the gateway selector 248 (S510). The communication controller 532 of the second serving gateway SGW2, upon receiving the Bearer Setup Requirement message from the switching station MME, controls the responder 534 (S530) so as to transmit, to the switching station MME, a Bearer Setup Ack message (path setting request completion response) containing the identification information of the second serving gateway SGW2 (S550). The response transmitter 446 of the switching station MME, upon receiving the Bearer Setup Ack message from the second serving gateway SGW2, transmits a Bearer Setup Ack message for the first base station eNB through the C-Plane path, the message containing the identification information of the second serving gateway SGW2 (S570).

The path setting requester 250 of the first base station eNB, upon receiving the Bearer Setup Ack message from the switching station MME, generates a Bearer Setup Requirement message (path setting request) containing the identification infoiiiiation of the second serving gateway SGW2 (S590), and transmits the message to the second base station PhNB (S610). The path setter 342 of the second base station PhNB sets the uplink S1-U bearer S1B-U using the identification information of the second serving gateway SGW2 contained in the Bearer Setup Requirement message transmitted from the path setting requester 250 of the first base station eNB (S630). When the uplink S1-U bearer S1B-U is set, the responder 344 transmits, to the first base station eNB, a Setup Complete message (path setting request completion response) containing the identification information of the second base station PhNB, with the message indicating the above bearer setting having been completed (S650).

The path setting requester 250 of the first base station eNB, upon receiving the Setup Complete message, generates a Bearer Modify Request message (path change request) containing the identification information of the second base station PhNB (S670), and transmits the message to the switching station MME through the C-Plane path (S690). The request transmitter 444 of the switching station MME, upon receiving the Bearer Modify Request message transmitted from the path setting requester 250 of the first base station eNB, transmits the Bearer Modify Request message for the second serving gateway SGW2 (S710). The path setter 536 of the second serving gateway SGW2 uses the identification information of the second base station PhNB contained in the Bearer Modify Request message transmitted from the switching station MME, to set the downlink S1-U bearer S1B-D (S730). The path setter 536 of the second serving gateway SGW2, when the downlink S1-U bearer S1B-D is set, transmits a Modify Complete message (path change request completion response) to the switching station MME (S750). The response transmitter 446 of the switching station MME transmits the Modify Complete message from the second serving gateway SGW2 to the first base station eNB (S770). With the above operation, the S1-U bearer S1B, which is bidirectionally communicable, is set. It is to be noted that, even after the setting of the S1-U bearer S1B, the C-Plane path (signaling radio bearer) established between the user equipment UE and the first base station eNB is maintained.

Hereinafter, the setting operation of the S1-U bearer of the second embodiment from the above-mentioned Steps S510 to S770 is collectively referred to as Step S52.

2(3). Effects of the Present Embodiment

According to the second embodiment described in the foregoing, similarly to the first embodiment, a radio communication system having the second base station PhNB, which is a new type differing from the first base station eNB, is realized. According to the above configuration, it is determined, based on identification information contained in the report information transmitted from the user equipment UE, whether a base station corresponding to the identification information is the second base station PhNB. Therefore, it becomes clear whether the base station for which the S1-U bearer S1B is to be established is the first base station eNB having the C-Plane path to the switching station MME or the second base station PhNB which does not have the C-Plane path to the switching station MME, and this is made to be used for the following determination.

Furthermore, when it is determined that an S1-U bearer S1B should be established and that one endpoint of the S1-U bearer S1B is the second base station PhNB, the first base station eNB selects a serving gateway SGW to be a connection point of the second base station PhNB (an element to which the S1-U bearer S1B is to be set). Therefore, a connection point (an element to which the S1-U bearer S1B is to be set) that is suitable for the second base station PhNB, which is an endpoint of the S1-U bearer S1B, can be selected.

Furthermore, instead of the switching station MME, the first base station eNB takes the initiative in controlling the second serving gateway SGW2 and the second base station PhNB, to establish the S1-U bearer S1B. Therefore, with the above configuration, even though the C-Plane path does not exist between the second base station PhNB and the switching station MME, the U-Plane path to the second base station PhNB can be set.

Third Embodiment

In the first and the second embodiments, the first base station eNB (the path setting determiner 244) determines, based on measurement information reported from the user equipment UE, whether to set an S1-U bearer S1B to a base station corresponding to the measurement information. In the third embodiment, the switching station MME has such a path setting determiner.

3(1). Configuration of Switching Station

Figure 17:
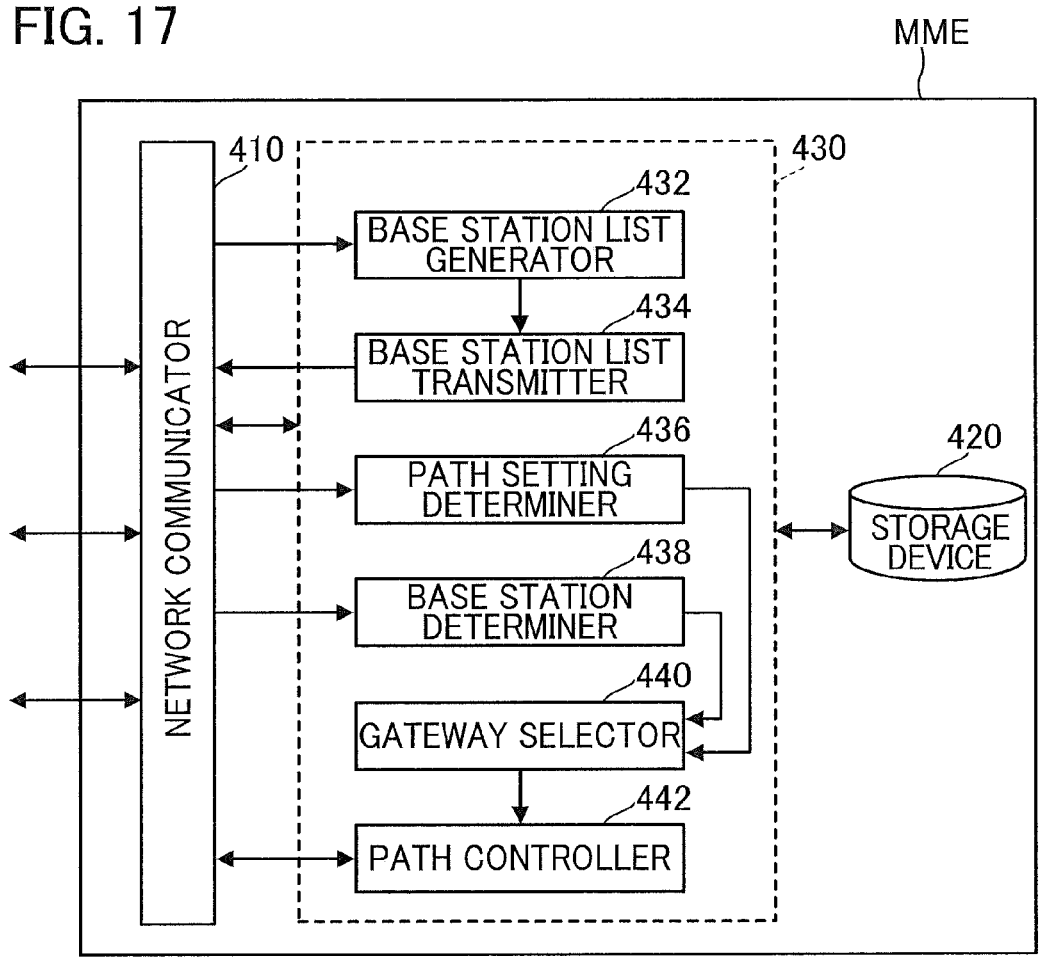
FIG. 17 is a block diagram showing a configuration of a switching station according to a third embodiment.

FIG. 17 is a block diagram showing a configuration of the switching station MME according to the third embodiment. The storage device 420 of the switching station MME of the third embodiment stores the base station list BL1 shown in FIG. 6. Furthermore, the controller 430 of the switching station MME of the third embodiment additionally has a path setting determiner 436 and a base station determiner 438. The path setting determiner 436 and the base station determiner 438 are functional blocks embodied by execution of a computer program like other elements in the controller 430.

3(2). Selection of Serving Gateway

Figure 18:
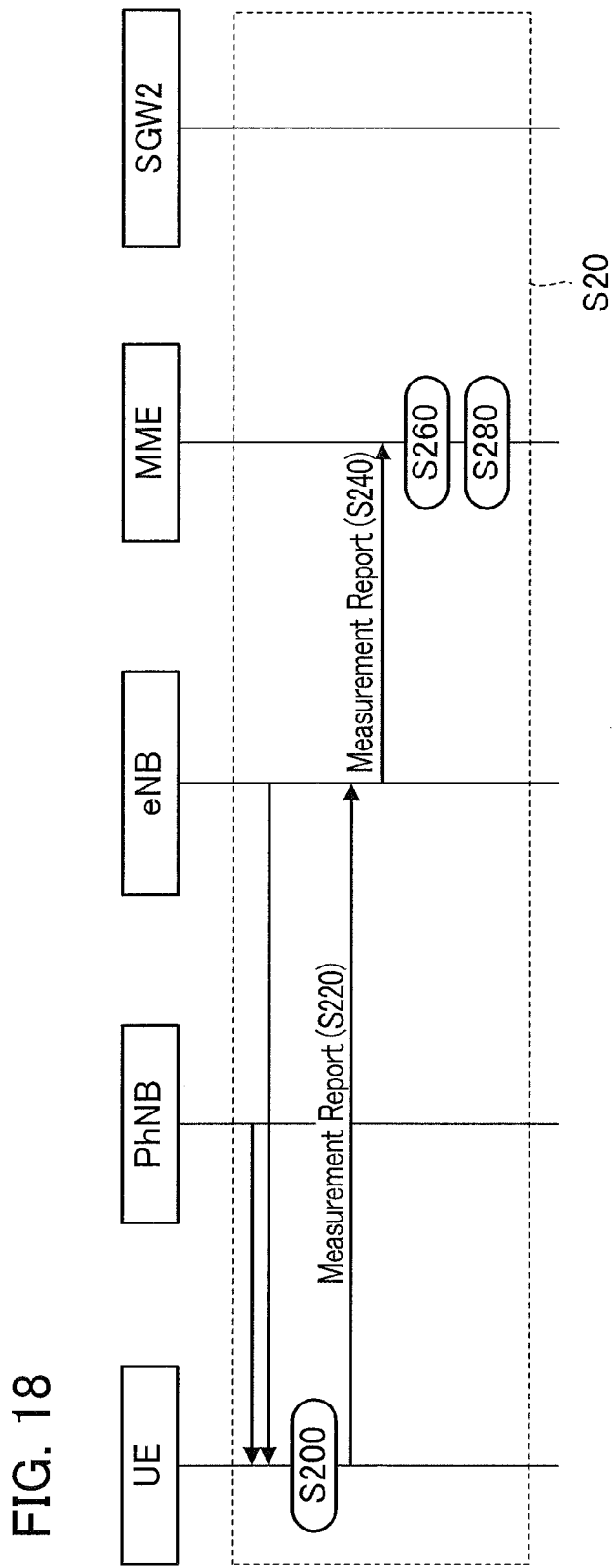
FIG. 18 is an operation flow showing an example of serving gateway selection according to the third embodiment.

Description will be given of an example operation of a selection of a serving gateway according to the third embodiment, with reference to FIG. 18. The initial assumptions with respect to the U-Plane bearer and the C-Plane bearer are similar to those of FIG. 11. The user equipment UE obtains measurement information and identification information in a similar manner as in the first embodiment (S200). The user equipment UE (the reporter 138) transmits a Measurement Report message (report information) containing the obtained measurement information and identification information to the first base station eNB to which the user equipment is being radio-connected (S220). The transferor 252 of the first base station eNB transmits the received Measurement Report message to the switching station MME through the C-Plane path (S240). Thus, the transferor 252 serves as a base station transmitter.

The path setting determiner 436 of the switching station MME determines, based on the measurement information contained in the Measurement Report message, whether to set an S1-U bearer S1B having, as one endpoint, a base station corresponding to the measurement information, and supplies the determination result to the gateway selector 440 (S260). In this example, similarly to what is described in the previous embodiments, we assume that the path setting determiner 436 determines that an S1-U bearer S1B having the second base station PhNB as one endpoint should be set. Furthermore, the base station determiner 438 of the switching station MME determines, based on identification information of a base station contained in the Measurement Report message, whether a base station corresponding to the identification information is the second base station PhNB, by using the base station list BL1 stored in the storage device 420 and supplies the determination result to the gateway selector 440 similarly to what is described in the previous embodiments (S260). In a case in which the path setting determiner 436 determines that an S1-U bearer S1B should be set, when the base station determiner 438 determines that a base station to be one endpoint of the S1-U bearer S1B is the second base station PhNB, the gateway selector 440 of the switching station MME selects a serving gateway SGW to be another endpoint of the S1-U bearer S1B (S280).

Hereinafter, the serving gateway selection operation of the third embodiment from the above-mentioned Steps S200 to S280 is collectively referred to as Step S20.

When the above-mentioned Step S20 is completed, the switching station MME is in a condition to know the serving gateway SGW having been selected as another endpoint of the S1-U bearer S1B. This situation can be understood as being similar to a situation in which Step S10 of the first embodiment is completed and a situation in which Step S12 of the second embodiment is completed. Therefore, after the completion of Step S20 of the third embodiment, the S1-U bearer setting operation by Step S50 of the first embodiment may be performed, or the S1-U bearer setting operation by Step S52 of the second embodiment may be performed.

3(3). Effects of the Present Embodiment

According to the third embodiment described in the foregoing, similarly to the first and second embodiments, a radio communication system having the second base station PhNB, which is a new type differing from the first base station eNB, is realized. According to the above configuration, effects similar to those in the previously described embodiments are attained.

Fourth Embodiment

In the first and second embodiments, the first base station eNB (base station determiner 246) determines whether a base station corresponding to the identification information is the second base station, and in the third embodiment, the switching station MME (base station determiner 438) determines whether a base station corresponding to the identification information is the second base station. In the fourth embodiment, the user equipment UE has a base station determiner to determine whether a base station is the second base station.

4(1). Configuration of Each Element

4(1) -1. Configuration of User Equipment

Figure 19:
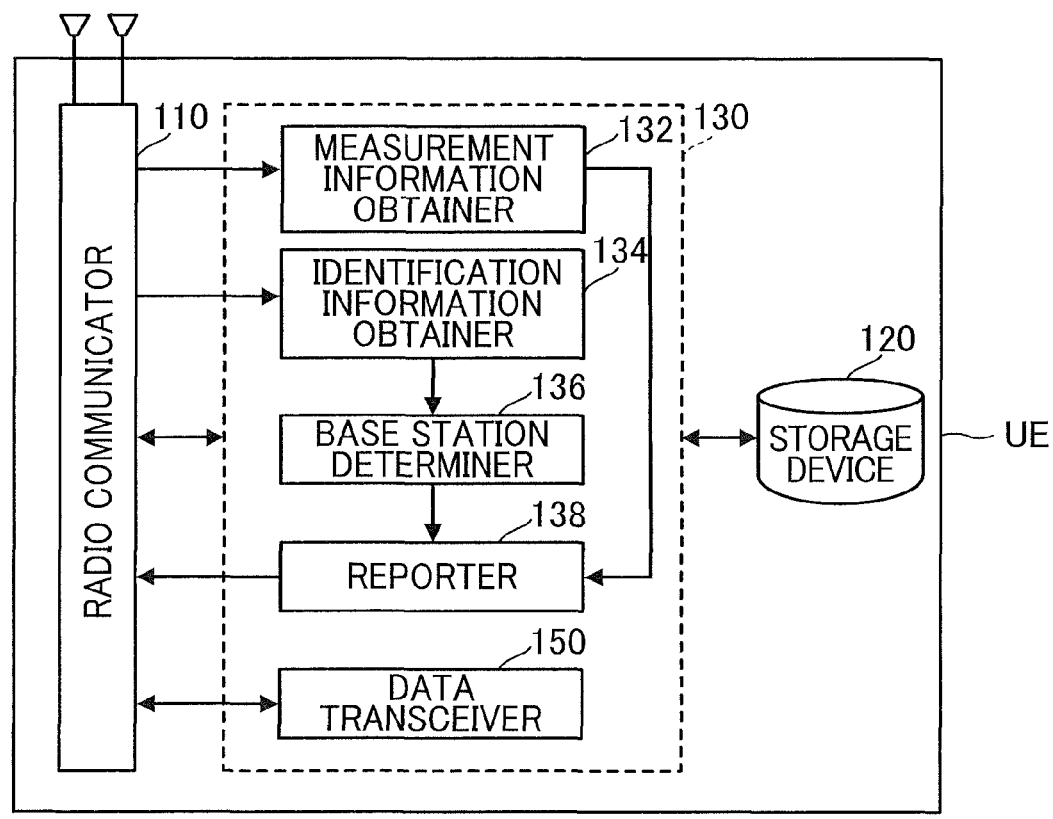
FIG. 19 is a block diagram showing a configuration of a user equipment according to a fourth embodiment.

FIG. 19 is a block diagram showing a configuration of the user equipment UE according to the fourth embodiment. The storage device 120 of the user equipment UE of the fourth embodiment stores the base station list BL1 shown in FIG. 6. Furthermore, the controller 130 of the user equipment UE of the fourth embodiment additionally has a base station determiner 136. The base station determiner 136 is a functional block embodied by execution of a computer program like other elements in the controller 130.

4(1) -2. Configuration of First Base Station

Figure 20:
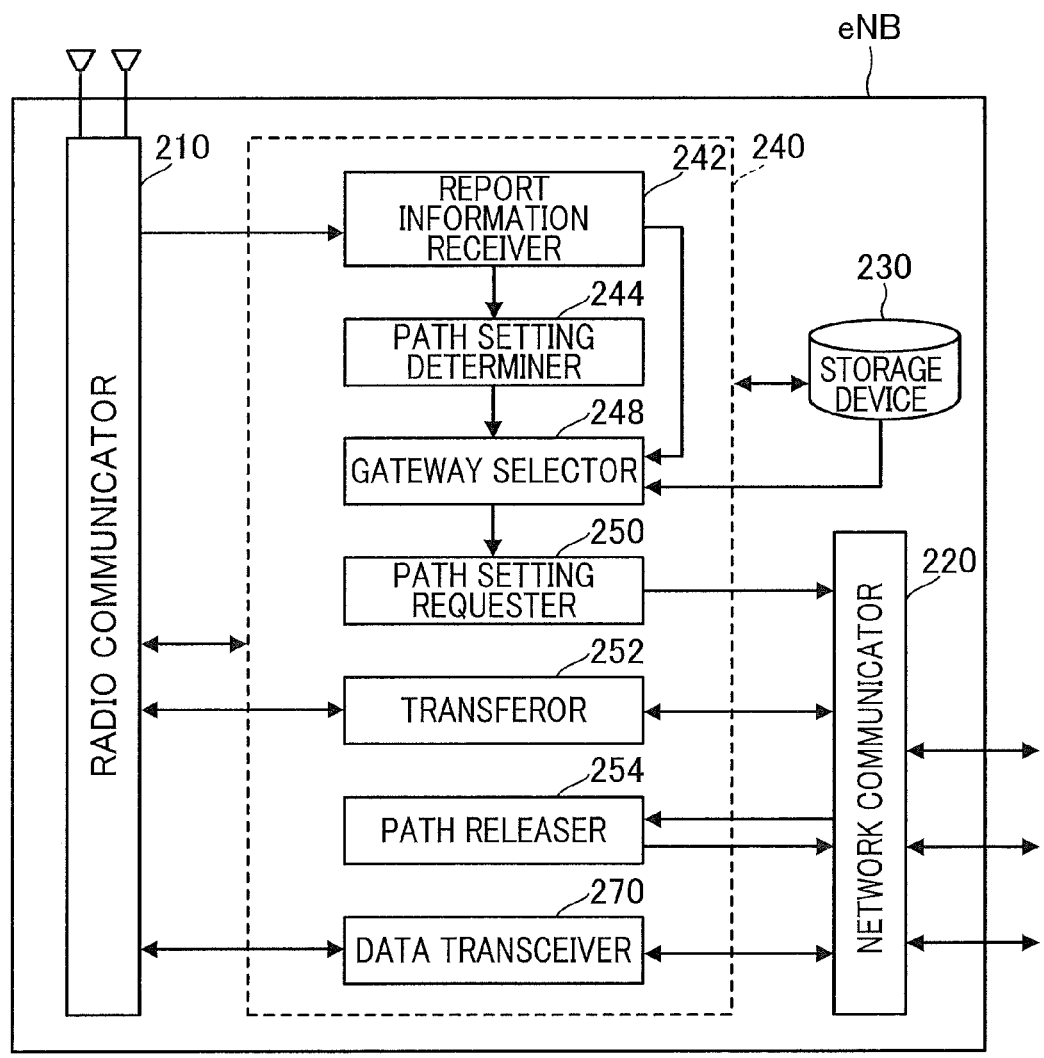
FIG. 20 is a block diagram showing a configuration of a first base station according the fourth embodiment.

FIG. 20 is a block diagram showing a configuration of the first base station eNB of the fourth embodiment. The storage device 230 of the first base station eNB of the fourth embodiment stores the base station list BL2 shown in FIG. 14. Furthermore, the controller 240 of the first base station eNB of the fourth embodiment additionally has a base station determiner 246.

4(2). Selection of Serving Gateway

Figure 21:
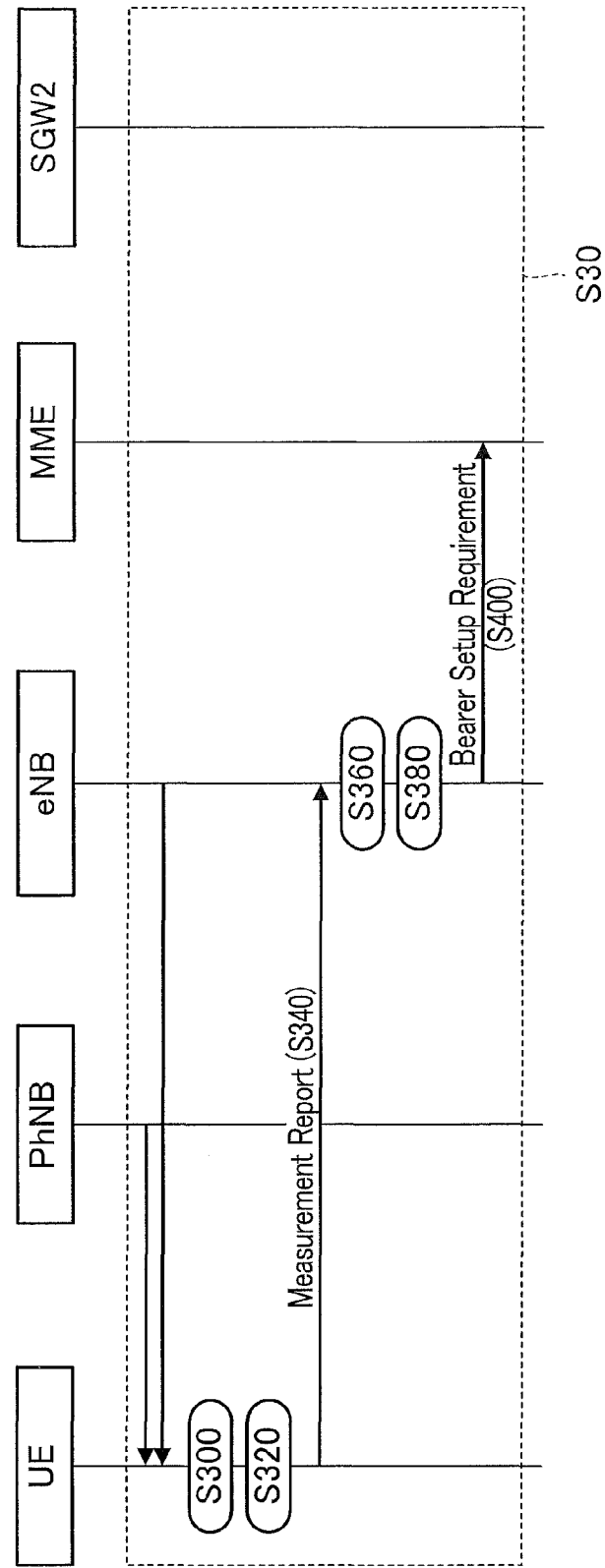
FIG. 21 is an operation flow showing an example of serving gateway selection according to the fourth embodiment.

Description will be given of an example operation of a selection of a serving gateway according to the fourth embodiment, with reference to FIG. 21. The initial assumptions with respect to the U-Plane bearer and the C-Plane bearer are similar to those of FIG. 11. The user equipment UE obtains measurement information and identification information in a manner similar to that in the first embodiment (S300). Furthermore, the base station determiner 136 of the user equipment UE determines whether a base station corresponding to the identification information supplied from the identification information obtainer 134 is the second base station PhNB, similarly to the previous embodiments, by using the base station list BL1 stored in the storage device 120 and supplies the determination result to the gateway selector 138 (S320). The reporter 138 transmits a Measurement Report message (report information) containing the obtained measurement information, identification information, and determination information indicating whether a base station corresponding to the identification information is a second base station, to the first base station eNB to which the user equipment is being radio-connected (S340). After the first base station eNB (report information receiver 242) receives the Measurement Report message, the measurement information and the determination information are supplied to the path setting determiner 244, and the identification information and the determination information are supplied to the base station determiner 248.

The path setting determiner 244 determines, based on the measurement information, whether to set an S1-U bearer S1B having, as one endpoint, a base station corresponding to the measurement information, and supplies the determination result to the gateway selector 248 (S360). In this example, similarly to what is described previously, we assume that the path setting determiner 244 determines that an S1-U bearer S1B having the second base station PhNB as one endpoint should be set. In a case in which the path setting determiner 244 determines that an S1-U bearer S1B should be set, when the determination information reported from the user equipment UE indicates that a base station to be one endpoint of the S1-U bearer S1B is the second base station PhNB, the gateway selector 248 selects a serving gateway SGW to be another endpoint of the S1-U bearer S1B, by using the base station list BL2, and supplies, to the path setting requester 250, information indicating the selected serving gateway SGW, as described earlier (S380). The path setting requester 250 transmits, to the switching station MME through the C-Plane path, a Bearer Setup Requirement message (path setting request) requiring setting of the S1-U bearer S1B between the second serving gateway SGW2 that the gateway selector 248 has selected and the second base station PhNB (S400).

Hereinafter, the serving gateway selection operation of the fourth embodiment from the above-mentioned Steps S300 to S400 is collectively referred to as Step S30.

When the above-mentioned Step S30 is completed, the switching station MME is in a condition to know the serving gateway SGW having been selected as another endpoint of the S1-U bearer S1B. This situation can be understood as being similar to a situation in which Step S10 of the first embodiment is completed and a situation in which Step S12 of the second embodiment is completed. Therefore, after the completion of Step S30 of the fourth embodiment, the S1-U bearer setting operation by Step S50 of the first embodiment may be performed, or the S1-U bearer setting operation by Step S52 of the second embodiment may be performed.

4(3). Modification of Fourth Embodiment

Figure 22:
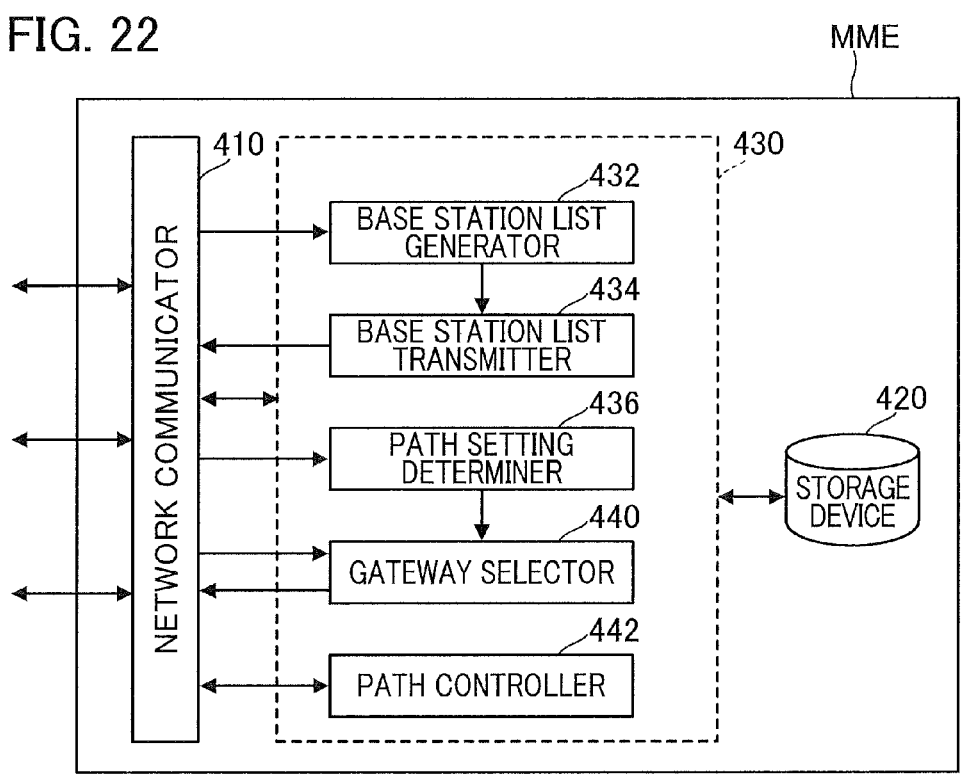
FIG. 22 is a block diagram showing a configuration of a switching station according to a modification of the fourth embodiment.
Figure 23:
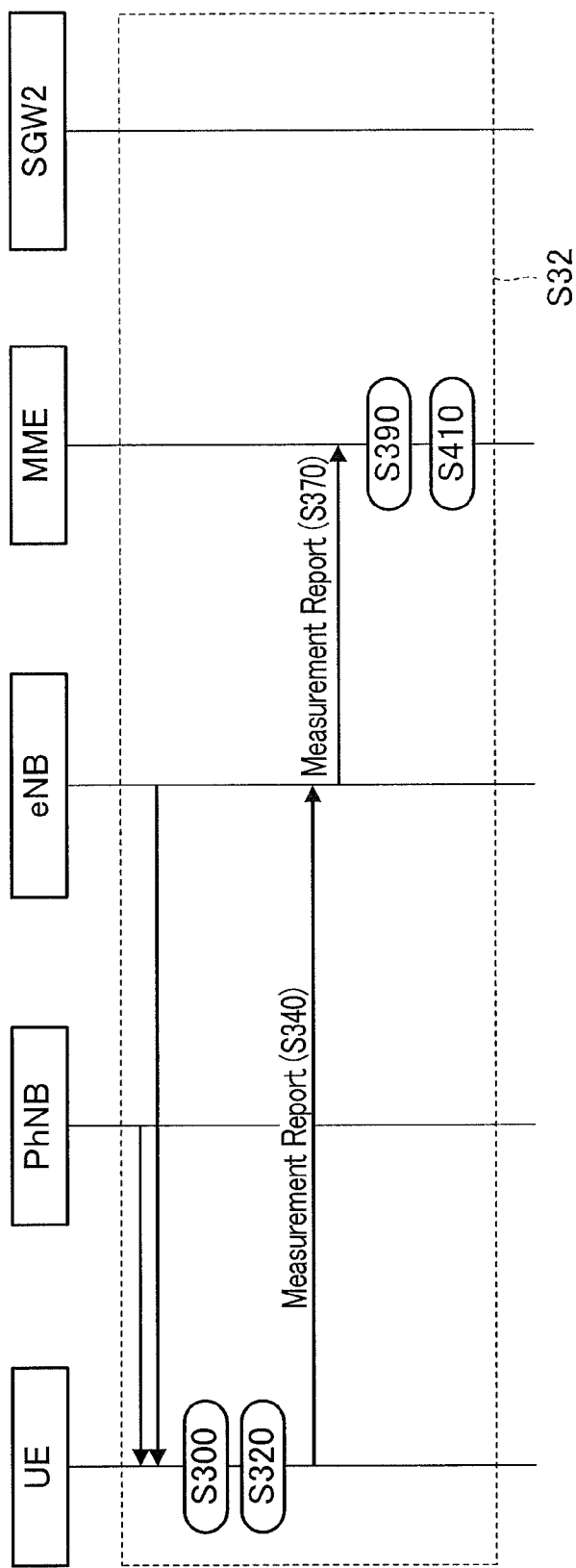
FIG. 23 is an operation flow showing an example of serving gateway selection according to the modification of the fourth embodiment.

In the above fourth embodiment, the first base station eNB selects a serving gateway SGW to be an endpoint of the S1-U bearer S1B, but a configuration can be adopted in which the switching station MME selects a serving gateway SGW. For example, as shown in FIG. 22, it is preferable that the controller 430 of the switching station MME have the path setting determiner 436 and the gateway selector 440. A more specific operation is described below with reference to FIG. 23.

A Measurement Report message is reported from the user equipment UE to the first base station eNB (S300 to S340), similarly to what is described above. The transferor 252 of the first base station eNB transmits the received Measurement Report message to the switching station MME through the C-Plane path (S370). Thus, the transferor 252 serves as a base station transmitter. The path setting determiner 436 of the switching station MME determines, based on the measurement information contained in the Measurement Report message transmitted from the first base station eNB, whether to set an S1-U bearer S1B having, as one endpoint, a base station corresponding to the measurement information, and supplies the determination result to the gateway selector 440 (S390). In a case in which the path setting determiner 436 determines that an S1-U bearer S1B should be set, when the determination information contained in the Measurement Report message indicates that a base station to be one endpoint of the S1-U bearer S1B is the second base station PhNB, the gateway selector 440 selects a serving gateway SGW to be another endpoint of the S1-U bearer S1B (S410).

Hereinafter, the serving gateway selection operation of the fourth embodiment from the above-mentioned Steps S300 to S410 is collectively referred to as Step S32.

When the above Step S32 is completed, because the switching station MME is in a condition to know the serving gateway SGW being selected as another endpoint of the S1-U bearer S1B, similarly to the previous description, the S1-U bearer setting operation by Step S50 of the first embodiment may be performed after the completion of Step S32, or the S1-U bearer setting operation by Step S52 of the second embodiment may be performed after the completion of Step S32.

4(4). Effects of the Present Embodiment

According to the fourth embodiment described in the foregoing, similarly to the first and second embodiments, a radio communication system having the second base station PhNB, which is a new type differing from the first base station eNB, is realized. According to the above configuration, effects similar to those in the previously described embodiments are attained.

5. Modifications

Various modifications may be applied to the above-described embodiment. Specific modifications are exemplified below. Two or more modifications selected from among the above embodiments and the following modifications may be combined.

5(1). Modification 1.

When the above-mentioned Step S12 of the second embodiment is completed, the switching station MME is in a condition to know the serving gateway SGW having been selected as another endpoint of the S1-U bearer S1B. This situation can be understood as being similar to a situation in which Step S10 of the first embodiment is completed. Therefore, after the completion of Step S12 of the second embodiment, the S1-U bearer setting operation by Step S50 of the first embodiment may be performed, instead of Step S52 of the second embodiment. Also, similarly, after the completion of Step S10 of the first embodiment, the S1-U bearer setting operation by Step S52 of the second embodiment may be performed, instead of Step S50 of the first embodiment.

5(2). Modification 2

In the above-described embodiment, one S1-U bearer S1B (U-Plane path) is set. The above-described path setting can be employed in newly establishing an S1-U bearer S1B and also in changing a path of an already established S1-U bearer S1B. For example, in a case in which an S1-U bearer S1B has not been established, the above-described path setting can be employed in newly establishing an S1-U bearer S1B. Also, in a case in which an S1-U bearer S1B has already been established between the first base station eNB and the first serving gateway SGW1, the above path setting can be employed in additionally establishing a new S1-U bearer S1B between the second base station PhNB and the second serving gateway SGW2. Also, in a case in which an S1-U bearer S1B has been established through the first base station eNB and the first serving gateway SGW1, the above path setting can be employed in changing a path so that the S1-U bearer S1B passes the second base station PhNB and the second serving gateway SGW2.

5(3). Modification 3.

The setting method of the base station list BL (BL1,BL2) stored in each storage device (120,230,420) in the above-described embodiments may be freely selected. For example, the base station list BL (BL1,BL2) may be set, in advance, to a node (user equipment UE, first base station eNB, switching station MME) having the storage device. Furthermore, it may be configured so that the base station list generator 432 of the switching station MME generates the base station list BL (BL1, BL2) and that the base station list transmitter 434 transmits the generated base station list BL (BL1, BL2) to each node (user equipment UE, first base station eNB) dynamically (e.g., depending on the updating of a list). With the above configuration, the base station list BL (BL1, BL2) is generated and is transmitted depending on a state (e.g., an installed condition of the second base station PhNB, a congestion state of the serving gateway SGW, etc.) of the radio communication system CS. Therefore, the determination using base the station list BL (BL1, BL2) better reflects a state of the radio communication system CS.

In the above-described embodiments, the base station list BL1 stores pieces of identification information of the second base stations PhNB. Instead, the base station list BL1 may store pieces of identification information of the first base stations eNB and pieces of identification information of the second base stations PhNB, and store, in correspondence with each other, each identification information piece and a piece of information indicating whether a base station corresponding to each piece of identification information is the first base station eNB or the second base station PhNB. The same applies to the base station list BL2.

5(4). Modification 4.

In the above-described embodiment, after the setting of the S1-U bearer S1B (Step S50 of the first embodiment and Step S52 of the second embodiment) is completed, the S1-U bearer S1B that has been established prior to the above setting may be released.

Figure 24:
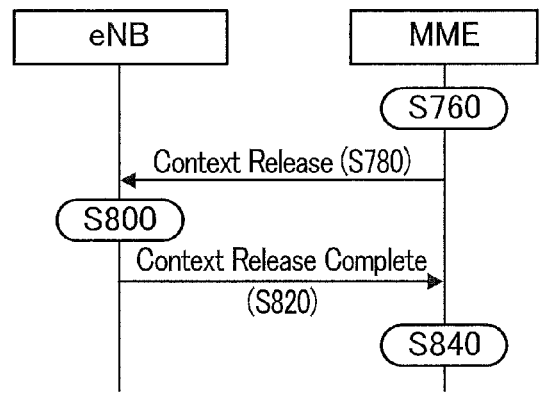
FIG. 24 is an operation flow showing an example of S1-U bearer releasing.

Description will be given of an example of releasing the S1-U bearer S1B, with reference to FIG. 24. In a case in which the S1-U bearer S1B through the first base station eNB has been established, the path controller 442 of the switching station MME determines whether to release the existing S1-U bearer S1B in response to a reception (S740) of the Setup Complete message (S760). In a case in which the path controller 442 determines that the existing S1-U bearer S1B is to be released, the path controller 442 transmits a Context Release message to the first base station eNB (S780). Upon receiving the Context Release message, the path releaser 254 of the first base station eNB deletes the setting information (context information) about the existing S1-U bearer S1B which the base station itself stores (S800), and transmits a Context Release Complete message to the switching station MME (S820). Upon receiving the Context Release Complete message, the path controller 442 of the switching station MME deletes the setting information (context information) about the existing S1-U bearer S1B that the switching station itself stores (S840). With the above operation, the existing S1-U bearer S1B is released. It is preferable that the above-described release operation be employed in the configuration of the first embodiment in which the switching station MME leads control (after completion of S50).

Figure 25:
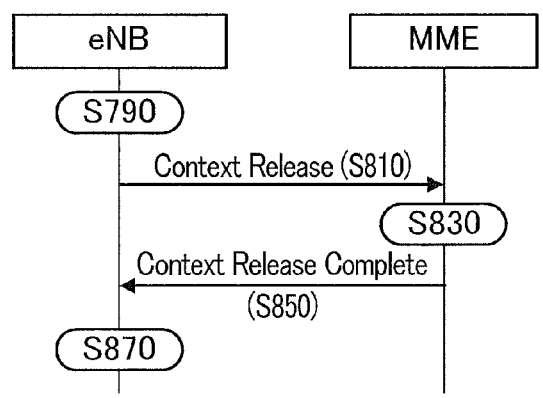
FIG. 25 is an operation flow showing an example of S1-U bearer releasing.

Description will be given of another example of releasing the S1-U bearer S1B, with reference to FIG. 25. In a case in which the S1-U bearer S1B through the first base station eNB has been established, the path releaser 254 of the first base station eNB determines whether to release the existing S1-U bearer S1B in response to a reception (S770) of the Modify Complete message (S790). In a case in which the path releaser 254 determines that the existing S1-U bearer S1B is to be released, the path releaser 254 transmits a Context Release message to the switching station MME (S810). Upon receiving the Context Release message, the path releaser 448 of the switching station MME deletes the setting information (context information) about the existing S1-U bearer S1B that the base station itself stores (S830), and transmits a Context Release Complete message to the first base station eNB (S850). Upon receiving the Context Release Complete message, the path releaser 254 of the first base station eNB deletes the setting information (context information) about the existing S1-U bearer S1B that the switching station itself stores (S870). With the above operation, the existing S1-U bearer S1B is released. It is preferable that the above-described release operation be employed in the configuration of the second embodiment in which the first base station eNB leads control (after completion of S52).

In the above-described modifications, the criteria as to whether to release the S1-U bearer S1B can be freely selected. For example, a configuration can be adopted in which the path controller 442 or the path releaser 254 determines that an S1-U bearer S1B is to be released in a case in which the reception power of radio signals from a base station (the first base station eNB in the above examples) to which the S1-U bearer S1B is set is equal to or less than a predetermined value.

5(5). Modification 5.

In the above-described embodiments, control messages of various names (e.g., Bearer Setup Request message, Bearer Setup Requirement message, etc.) are used. However, it is understood as a matter of course that the name of each control message can be freely selected. Each control message is a concept that subsumes any control signal having an equivalent function.

5(6). Modification 6.

Figure 26:
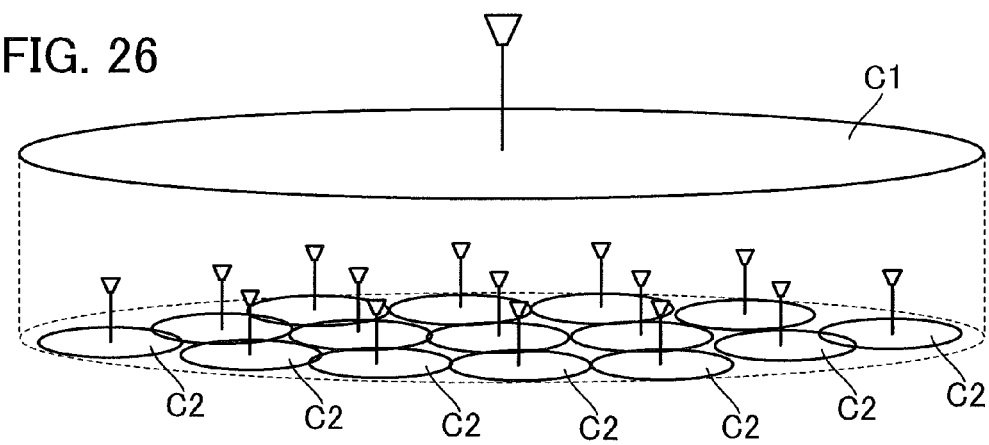
FIG. 26 is an explanation diagram showing a configuration of cells formed by each base station.

In the above-described embodiment, the size of a cell C (the range in which radio waves arrive effectively) which each base station forms therearound can be freely selected. For example, a configuration can be employed in which the radio transmission ability (average transmitted power, maximum transmitted power, etc.) of the first base station eNB is greater than the radio transmission ability of the second base station PhNB and in which the size of a cell (macro cell C1) the first base station eNB forms is greater than the size of a cell (small cell C2) the second base station PhNB forms. In the above-described configuration, for example, as shown in FIG. 26, it is preferable that the small cells C2 be formed in a multilayered manner (overlaid) inside the macro cell C1 (for convenience of diagramming, a plane in which the macro cell C1 is shown is different from a plane in which the small cells C2 are shown; however, in reality, the macro cell C1 and the small cells C2 are superimposed in the same plane (the surface of the Earth or the like)). On the other hand, a configuration can be employed in which the first base station eNB and the second base station PhNB form cells C of approximately the same size.

5(7). Modification 7.

A configuration can be adopted in which a frequency band of radio waves, which the first base station eNB transmits, differs from a frequency band of radio waves which the second base station PhNB transmits. For example, we assume a configuration in which the first base station eNB performs radio communication using the first frequency band (e.g., 2 GHz band) and the second base station PhNB performs radio communication using the second frequency band (e.g., 3.5 GHz band) that is higher than the first frequency band. This is because the higher the frequency is, the larger propagation loss becomes, and the radio communication using the first frequency band is higher in stability than the radio communication using the second frequency band, in many cases. As described in the above embodiments, the first base station eNB performs transmission and reception (communication of C-Plane) of control signals (control messages) to and from the user equipment UE. Therefore, when the configuration of this modification is employed, since transmission and reception (communication of C-Plane) of control signals is performed in the first frequency band, which is more stable, the user equipment UE can be controlled with a higher degree of certainty.

5(8). Modification 8.

In the above-described embodiment, the first base station eNB is an evolved Node B prescribed in the 3 GPP standard. However, the first base station eNB can be any radio base station. For example, the first base station eNB may be a base station forming the above-described small cell C2.

5(9). Modification 9.

In the above-described embodiment, the second base station PhNB does not transmit or receive control signals to and from the user equipment UE. However, a configuration can be adopted in which the second base station PhNB can transmit and receive control signals of a subordinate layer (e.g., L1 layer, L2 layer). Also in this configuration, the second base station PhNB does not transmit or receive signals related to radio resource control (control signals of an RRC layer).

5(10). Modification 10.

The user equipment UE is capable of communicating by radio with the first base station eNB and the second base station PhNB. The user equipment UE may be a cell phone terminal, e.g., a feature phone or a smart phone, a desk-top type personal computer, a laptop personal computer, a UMPC (ultra-mobile personal computer), a portable game machine, or other type of radio terminal.

5(11). Modification 11.

In each of the elements in the radio communication system CS (the user equipment UE, the first base station eNB, the second base station PhNB, the switching station MME, the serving gateway SGW, the packet gateway PGW), functions executed by the CPU may be executed instead by hardware or by a programmable logic device, such as an FPGA (Field Programmable Gate Array) or a DSP (Digital Signal Processor).

REFERENCE SYMBOLS

UE . . . user equipment, 110 . . . radio communicator, 120 . . . storage device, 130 . . . controller, 132 . . . measurement information obtainer, 134 . . . identification information obtainer, 136 . . . base station determiner, 138 . . . reporter, 150 . . . data transceiver, eNB . . . first base station, 210 . . . radio communicator, 220 . . . network communicator, 230 . . . storage device, 240 . . . controller, 242 . . . report information receiver, 244 . . . path setting determiner, 246 . . . base station determiner, 248 . . . gateway selector, 250 . . . path setting requester, 252 . . . transferor, 254 . . . path releaser, 270 . . . data transceiver, PhNB . . . second base station, 310 . . . radio communicator, 320 . . . network communicator, 330 . . . storage device, 340 . . . controller, 342 . . . path setter, 344 . . . responder, 350 . . . data transceiver, MME . . . switching station, 410 . . . network communicator, 420 . . . storage device, 430 . . . controller, 432 . . . base station list generator, 434 . . . base station list transmitter, 436 . . . path setting determiner, 438 . . . base station determiner, 440 . . . gateway selector, 442 . . . path controller, 444 . . . request transmitter, 446 . . . response transmitter, 448 . . . path releaser, SGW . . . serving gateway, 510 . . . network communicator, 520 . . . storage device, 530 . . . controller, 532 . . . communication controller, 534 . . . responder, 536 . . . path setter, 540 . . . data transceiver, PGW . . . packet gateway, 610 . . . network communicator, 620 . . . external network communicator, 630 . . . storage device, 634 . . . data transceiver, 640 . . . controller, 642 . . . communication controller, 644 . . . data transceiver, BL . . . base station list, C . . . cell, C1 . . . macro cell, C2 . . . small cell, CS . . . radio communication system, IN . . . the Internet, NW . . . network, S1B . . . S1-U bearer, S1B-D . . . downlink S1-U bearer, S1B-U . . . uplink S1-U bearer.

The invention claimed is:

1. A radio communication system comprising:
a user equipment;
plural base stations radio-communicable with the user equipment;
plural serving gateways; and
a switching station for controlling a user-plane path that is a logical path that is set between a base station and a serving gateway, the logical path being a path for transmitting a user data signal,
the plural base stations including:
a first base station having a control-plane path that is a logical path that is set to the switching station, the logical path being a path for transmitting a control signal; and
a second base station having no control-plane path to the switching station,
the user equipment comprising:
a transmitter that reports, to a first base station to which the user equipment is radio-connecting, report information containing measurement information related to reception quality of a radio signal received from each base station and identification information of each base station corresponding to each measurement information, and
the first base station comprising:
a processor that:
determines whether to set, based on the measurement information reported from the user equipment, the user-plane path having, as one endpoint, a base station corresponding to the measurement information; and
determines, based on the identification information reported from the user equipment, whether a base station corresponding to the identification information is the second base station.

2. The radio communication system according to claim 1, wherein
the first base station further comprising:
a transmitter that transmits, to the switching station, a path setting request requiring the setting of the user-plane path via the control-plane path, in a case in which the processor of the first base station determines that the user-plane path is to be established and when the processor of the first base station determines that a base station to be one endpoint of the user-plane path, is the second base station, and
the switching station comprising;
a processor that selects a serving gateway to he another endpoint of the user-plane path of which the path setting request requires setting.

3. The radio communication system according to claim 1, wherein the processor of the switching station generates a base station list having stored pieces of identification information of plural second base stations and
wherein the switching station further comprises:
a transmitter that dynamically transmits the generated base station list to the first base station.

4. A radio communication system comprising:
a user equipment;
plural base stations radio-communicable with the user equipment;
plural serving gateways; and
a switching station for controlling a user-plane path that is a logical path that is set between a base station and a serving gateway, the logical path being a path for transmitting a user data signal,
the plural base stations including:
a first base station having a control-plane path that is a logical path that is set to the switching station, the logical path being a path for transmitting a control signal; and
a second base station having no control-plane path to the switching station, the user equipment comprising:
a transmitter that reports, to a first base station to which the user equipment is radio-connecting, report information containing measurement information related to reception quality of a radio signal received from each base station and identification information of each base station corresponding to each measurement information,
the first base station comprising:
a transmitter that transmits the report information reported from the user equipment to the switching station via the control-plane path, and
the switching station comprising:
a processor that:
determines whether to set, based on the measurement information reported from the user equipment, the user-plane path having, as one endpoint, a base station corresponding to the measurement information; and
determines, based on the identification information reported from the user equipment, whether a base station corresponding to the identification information is the second base station.

5. The radio communication system according to claim 4, wherein when the processor of the switching station determines that a base station to be the one endpoint of the user-plane path is the second base station in a case in which the processor of the switching station determines to set the user-plane path, the processor of the switching station selects a serving gateway to be another endpoint of the user-plane path having the second base station as the one endpoint.

6. A radio communication system comprising:
a user equipment;
plural base stations radio-communicable with the user equipment;
plural serving gateways; and
a switching station for controlling a user-plane path that is a logical path that is set between a base station and a serving gateway, the logical path being a path for transmitting a user data signal,
the plural base stations including:
a first base station having a control-plane path that is a logical path that is set to the switching station, the logical path being a path for transmitting a control signal; and
a second base station having no control-plane path to the switching station, and
the user equipment comprising:
a processor that:
obtains measurement information about reception quality of a radio signal received from each base station;
obtains identification information of a base station corresponding to each measurement information;
determines, based on the obtained identification information, whether a base station corresponding to the identification information is the second base station; and
a transmitter that reports, to a first base station to which the user equipment is being radio-connecting, report information containing each measurement information, the identification information corresponding to the each measurement information, and determination information indicating whether the base station corresponding to the identification information is the second base station,
the first base station comprising:
a base station transmitter that transmits the report information reported from the user equipment to the switching station via the control-plane path, and
the switching station comprising:
a processor that;
determines whether to set, based on the measurement information contained in the report information transmitted from the first base station, the user-plane path having, as one endpoint, a base station corresponding to the measurement information; and
when the determination information contained in the report information indicates that a base station to be the one endpoint of the user-plane path is the second base station in a ease in which the processor of the switching station determines to set the user-plane path, selects a serving gateway to he another endpoint of the user-plane path.

7. The radio communication system according to claim 2, wherein
the switching station further comprising:
a transmitter that transmits a first path setting instruction instructing to set the user-plane path between the serving gateway and the second base station, to the serving gateway to be another endpoint of the user-plane path selected by the gateway selector, the serving gateway comprising:
a transmitter that transmits to the switching station, in response to receiving of the first path setting instruction from the switching station, a first path setting instruction response containing identification information of the serving gateway,
wherein the transmitter of the switching station transmits, via the control-plane path to the first base station, a second path setting instruction containing the identification information of the serving gateway in response to receiving of the first path setting instruction response from the serving gateway,
the transmitter of the first base station
transfers the second path setting instruction to the second base station,
the second base station comprising:
a processor that sets the user-plane path for an uplink by using the identification information of the serving gateway contained in the second path setting instruction transferred from the first base station; and
a transmitter that transmits, to the first base station, a second path setting instruction response containing identification information of the second base station after the user-plane path for the uplink is set,
wherein the transmitter of the first base station transfers the second path setting instruction response to the switching station via the control-plane path,
wherein the transmitter of the switching station transmits, to the serving gateway, a third path setting instruction containing the identification information of the second base station in response receiving of the second path setting instruction response from the first base station, and
the serving gateway further comprising:
a processor that sets the user-plane path for a downlink by using the identification information of the second base station contained in the third path setting instruction transmitted from the switching station.

8. The radio communication system according to claim 7, wherein
the first base station further comprising:
a first interface having plural protocol layers set to the second base station and a second interface having plural protocol layers set to the switching station, and
wherein the transmitter of the first base station transfers control information from the switching station to the second base station and transfers control information from the second base station to the switching station by revolting the identification information of a destination node corresponding to any one of the plural protocol layers.

9. The radio communication system according to claim 8, wherein the transmitter of the first base station transfers control information from the switching station to the second base station and transfers control information from the second base station to the switching station by rewriting an IP address being identification information corresponding to an IP layer included in the plural protocol layers.

10. The radio communication system according to claim 2, wherein
the switching station further comprising:
a transmitter that transmits a path setting request to the serving gateway to be another endpoint of the user-plane path selected by the gateway selector, in response to receiving of the path setting request transmitted from the first base station,
the serving gateway comprising:
a transmitter that transmits to the switching station, in response to receiving of the path setting request from the switching station, a path setting request completion response containing identification information of the serving gateway,
the transmitter of the switching station transmits, in response to receiving of the path setting request completion response from the serving gateway, a path setting request completion response for the first base station, the response containing the identification information of the serving gateway,
the transmitter of the first base station transmits to the second base station, in response to receiving of the path setting request completion response from the switching station, a path setting request completion response containing the identification information of the serving gateway,
the second base station comprising:
a processor that sets the user-plane path for an uplink by using the identification information of the serving gateway contained in the path setting request transferred from the first base station; and
a transmitter that transmits, to the first base station, a path setting request completion response containing identification information of the second base station after the user-plane path for the uplink is set,
the transmitter of the first base station transmits to the switching station, in response to receiving of the path setting request completion response from the second base station, a path change request containing the identification information of the second base station,
the transmitter of the switching station transmits, in response to receiving of the path change request from the first base station, a path change request for the serving gateway, and
the serving gateway further comprising:
a processor that sets the user-plane path foir a downlink by using the identification information of the second base station contained in the path change request transmitted from the switching station.

* * * * *